United States Patent
Pryce et al.

(10) Patent No.: US 8,625,105 B2
(45) Date of Patent: Jan. 7, 2014

(54) VEHICLE TYRE MEASUREMENT

(75) Inventors: Andrew Pryce, Bicester (GB); Björn Åke Gustafsson, Oxford (GB)

(73) Assignee: Sigmavision Limited, Oxfordshire (DE)

( * ) Notice: Subject to any disclaimer, the term of this patent is extended or adjusted under 35 U.S.C. 154(b) by 156 days.

(21) Appl. No.: 13/254,319

(22) PCT Filed: Mar. 3, 2010

(86) PCT No.: PCT/GB2010/000377
§ 371 (c)(1),
(2), (4) Date: Sep. 22, 2011

(87) PCT Pub. No.: WO2010/100417
PCT Pub. Date: Sep. 10, 2010

(65) Prior Publication Data
US 2012/0008148 A1      Jan. 12, 2012

(30) Foreign Application Priority Data
Mar. 3, 2009 (GB) .................................. 0903689.8

(51) Int. Cl.
*G01B 11/245* (2006.01)
*G01B 11/275* (2006.01)

(52) U.S. Cl.
USPC ...................................... 356/601; 356/139.09

(58) Field of Classification Search
USPC ............ 356/139.09, 152.1, 152.2, 35.5, 601; 73/146, 152.05, 148.8; 250/559.19, 250/339, 341
See application file for complete search history.

(56) References Cited

U.S. PATENT DOCUMENTS

| | | | | |
|---|---|---|---|---|
| 3,644,047 A | * | 2/1972 | Brown et al. | 356/458 |
| 3,828,126 A | * | 8/1974 | Ramsey, Jr. | 348/40 |
| 3,930,141 A | * | 12/1975 | Koyama et al. | 382/104 |
| 3,982,835 A | * | 9/1976 | Schwomma | 356/458 |
| 4,363,966 A | * | 12/1982 | Cheo | 250/338.1 |
| 4,631,831 A | | 12/1986 | Bacher et al. | |
| 5,481,356 A | * | 1/1996 | Pouet et al. | 356/35.5 |
| 5,600,435 A | * | 2/1997 | Bartko et al. | 356/139.09 |
| 5,801,304 A | | 9/1998 | Cantu et al. | |
| 5,895,845 A | | 4/1999 | Buerger | |
| 5,987,978 A | | 11/1999 | Whitehead | |
| 6,100,923 A | * | 8/2000 | Sass et al. | 348/94 |
| 6,327,904 B1 | * | 12/2001 | Oldenettel | 73/146 |
| 6,789,416 B1 | | 9/2004 | Tracy | |
| 6,840,097 B1 | | 1/2005 | Huber et al. | |
| 7,269,997 B2 | | 9/2007 | Dale, Jr. | |

(Continued)

FOREIGN PATENT DOCUMENTS

| | | |
|---|---|---|
| DE | 4316984 A1 | 8/1994 |
| DE | 19737919 A1 | 3/1999 |

(Continued)

*Primary Examiner* — Sang Nguyen
(74) *Attorney, Agent, or Firm* — Browdy and Neimark, PLLC

(57) ABSTRACT

An apparatus measures the tread of a tire on a vehicle, in which a laser line generator (34) generates an elongate pattern of light. Mirrors (36) are arranged to reflect light from the laser line generator (34) onto the rolling surface of the tire. Mirrors (36, 38, 42) are arranged to reflect light from different regions of the rolling surface of the tire towards a camera (32). The camera images the regions of the rolling surface of the tire. The apparatus may be hand-held or arranged such that a tire to be aged is driven onto or over it.

28 Claims, 16 Drawing Sheets

(56) References Cited

U.S. PATENT DOCUMENTS

| | | | |
|---|---|---|---|
| 7,469,579 B2 * | 12/2008 | Iwase et al. | 73/146 |
| 7,578,180 B2 * | 8/2009 | Lionetti et al. | 73/146 |
| 7,909,078 B2 * | 3/2011 | Burg et al. | 156/360 |
| 8,074,506 B2 * | 12/2011 | Maehner et al. | 73/146 |
| 2003/0160193 A1 | 8/2003 | Sanchez et al. | |
| 2005/0057758 A1 | 3/2005 | Uehara | |
| 2005/0268707 A1 * | 12/2005 | Dale et al. | 73/146 |
| 2008/0011074 A1 | 1/2008 | Braghiroli | |
| 2008/0273194 A1 * | 11/2008 | De Sloovere et al. | 356/139.09 |
| 2009/0320581 A1 | 12/2009 | Angell et al. | |

FOREIGN PATENT DOCUMENTS

| | | |
|---|---|---|
| WO | WO 9610727 A1 | 4/1996 |
| WO | WO 9707380 A2 | 2/1997 |
| WO | WO 9834090 A1 | 8/1998 |
| WO | WO 2008061770 A1 | 5/2008 |
| ZA | 9807733 A | 3/1999 |

* cited by examiner

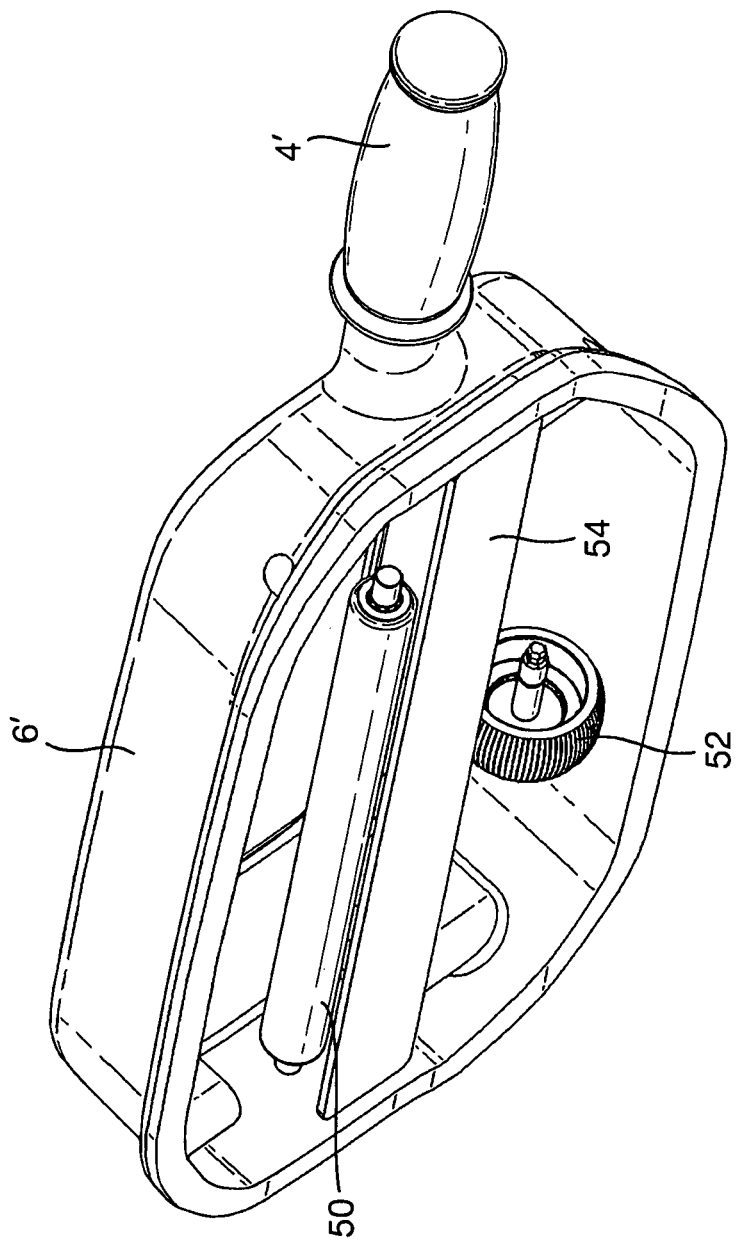

VEHICLE TYRE MEASUREMENT

FIELD

This invention relates to the optical assessment of vehicle tyres, particularly but not exclusively to determine a measure of the depth of the tyre's tread.

BACKGROUND

Tyres for road-going vehicles are typically provided with a complex pattern of grooves, known as tread, for displacing water from between the tyre and a road surface in order to improve traction in wet conditions. Because of the safety importance of tyre tread, national laws typically prescribe minimum tread depths for the tyres of road-going vehicles. For example, the tyres of a domestic car in the United Kingdom are required to have a minimum depth of the tread of 1.6 mm in a continuous band throughout the central 75% of the tread width and around the complete circumference of the tyre. Heavier vehicles in the UK have similar requirements but to a minimum depth of 1 mm.

Tread depth, however, is difficult to measure accurately. Often only an unreliable, qualitative visual inspection may be performed. Quantitatively, a manual tread depth gauge, comprising a simple sliding ruled plunger may be used to determine an approximate tread depth at a single point on the tyre's surface. Manual devices of this type suffer from a wide variation in readings from operator to operator, and they cannot practicably be used to determine the tread depth across and around most or all of the tyre's rolling surface.

As purchasing and fitting replacement tyres can form a significant part of the total cost of running a vehicle, premature replacement can be regarded as wasteful. This is especially true for fleet operators, such as a bus and haulage company, who have large numbers of tyres to replace each year. Conversely, continuing to use tyres that do not satisfy legal or commercial minimum tread requirements may be illegal and can compromise vehicle safety. Thus, a system for easily monitoring the wear of a tyre is required. Since removing the wheel from a vehicle is a time-consuming operation, it is desirable that in situ tread depth measuring can occur (i.e. with the tyre still on the vehicle). Having to drive the vehicle onto a "rolling road" in a garage or depot is often undesirable due to it being time-consuming (potentially requiring both a driver and an assistant) and space-consuming.

Rather, a portable apparatus for in situ measuring is desired, which can be used by a single operator on stationary vehicles for a thorough inspection of the vehicle's tyre surface. In this way, no additional space in a garage or depot is required, and vehicles can be efficiently parked, and the drivers dismissed, before tyre monitoring commences.

U.S. Pat. No. 5,895,845 (Buerger) describes a mobile device for measuring the tread depth of a tyre at a single point. The device is arranged so that it can be manually swept along a single line across the width of the tyre in the axial direction. However, scanning only along a single line will not detect excessive wear or erratic bald spots on the tyre's surface; nor can it provide information for checking that the tread forms a continuous band around the circumference of the tyre. Since tyre wear is often not, in practice, circumferentially uniform, this is a significant shortcoming when a thorough inspection of the tyre is required. This device is not able to confirm compliance with legal minimum tread requirements with a high degree of confidence.

U.S. Pat. No. 6,789,416 (Tracy et al.) also teaches a device for measuring a tyre tread profile by automatically scanning a laser spot along a line across the width of the tyre in the axial direction. It also therefore suffers the same shortcomings in this regard as the device of U.S. Pat. No. 5,895,845. Furthermore, it employs a motor-driven toothed belt to move a range finder along the length of a rod while measurement is being taken. Such reliance on moving parts is undesirable.

U.S. Pat. No. 5,987,978 (Whitehead) describes a handheld device provided with guide rollers allowing the device to be rolled around the circumference of the tyre, and having an inclined, facetted mirror, with a saw-tooth profile, spanning the width of the tyre, in order that light from a single light source located away from the tyre may directed at the tyre. However, the Applicant has calculated that in order to transfer a useful amount of light onto the tyre surface, such a mirror arrangement would need to be inclined close to 45 degrees, and therefore result in a device at least as high as the tyre is wide, which would make it awkward to handle and far too big to fit within the space between the tyre surface and a typical vehicle's wheel arch (a gap of typically up to 100 mm in places for a commercial vehicle). At shallower angles, such as are suggested in the drawings, the facetted mirror would direct only a line of spots of light onto the tyre's surface rather than a continuous line of light, thus yielding poor coverage of the whole width of the tyre's rolling surface.

SUMMARY

From a first aspect, the invention provides a system for performing a measurement of the tread of a tyre mounted on a wheel installed on a vehicle axle, the system having a portable sensor unit comprising:
light-emitting means arranged to project an elongate pattern of light onto the rolling surface of the tyre;
first and second imaging means arranged in use to image respective first and second regions of the rolling surface of the tyre, the first region extending further towards the inner sidewall of the tyre than does the second region; and
tyre engaging means arranged to locate the sensor unit in use against the tyre such that the second imaging means is situated further from the inner sidewall of the tyre than is the first imaging means,
the system further comprising processing means arranged to receive data from said first and second imaging means and to process said date to perform said tread measurement.

The invention further provides a portable sensor unit for use in performing a measurement of the tread of a tyre mounted on a wheel installed on a vehicle axle, the sensor unit comprising:
light-emitting means arranged to project an elongate pattern of light onto the rolling surface of the tyre;
first and second imaging means arranged in use to image respective first and second regions of the rolling surface of the tyre, the first region extending further towards the inner sidewall of the tyre than does the second region; and
tyre engaging means arranged to locate the sensor unit in use against the tyre such that the second imaging means is situated further from the inner sidewall of the tyre than is the first imaging means.

The invention extends to a method for using such a system and thus, from a further aspect, the invention provides a method of performing a measurement of the tread of a tyre mounted on a wheel installed on a vehicle axle comprising:
situating first and second imaging means such that the second imaging means is situated further from the inner sidewall of the tyre than is the first imaging means;

projecting an elongate pattern of light onto the rolling surface of the tyre; and imaging first and second regions of the rolling surface of the tyre with said first and second imaging means respectively, the first region extending further towards the inner sidewall of the tyre than does the second region.

Preferably the method further comprises processing data from said first and second imaging means to perform a measurement of the tread of the tyre.

Thus it will be appreciated by the person skilled in the art that a system or method according to the present invention employs more than one imaging means (e.g. a camera, possibly comprising associated additional mirrors and/or lenses), spread across the width of the tyre's surface, with each one having in view a different (albeit possibly overlapping) region of the tyre's surface, such that the field of view of each camera is typically less than the full width of the tyre's rolling surface. The use of more than one camera (or other imaging means), enables each camera to be situated closer to the surface of the tyre than would be possible if a single camera were used to image the entire width of the tyre, as in previous known arrangements.

The ability to situate the imaging means closer to the surface of the tyre allows a portable sensor unit to be sufficiently compact as to fit within the space between the in situ tyre and the vehicle's wheel arch. A more compact portable sensor unit can also result in more efficient optics (since, for example, optical path lengths can be shorter and fewer optical components may be needed), as well as being lighter and easier to handle.

The processing means could be part of the sensor unit or remote from it. If it is remote a wired or preferably wireless connection could be provided.

The invention is not limited to having just two imaging means; it will be readily understood that the concept extends to more than two imaging means; e.g. three, four, five or more imaging means. These are preferably arranged in use to image respective regions of the rolling surface of the tyre, each region being a unique distance from the inner sidewall of the tyre. The optics are preferably able to construct a continuous image with no blind spots by comparing the images from adjacent cameras. Preferably the imaging means themselves are situated at unique distances from the inner sidewall of the tyre. Distance from the inner sidewall could here be understood to be the shortest distance between the plane of the inner sidewall of the tyre (normal to the wheel's axis) and the centre of the sensor of the imaging means. Alternatively, it may indicate the distance to any appropriate respective common point or feature of each imaging means.

Preferably the light-emitting means is situated, in use, wholly or substantially between the plane of the outside sidewall of the tyre and the plane of the inside sidewall of the tyre (i.e. within the space between the tyre and the vehicle's wheel arch). The light-emitting means is preferably arranged to emit at least one "sheet of light" towards the tyre such that said elongate pattern of light, from the viewpoint of the light-emitting means, appears as a straight line. Preferably said is line parallel to the axis of rotation of the tyre (i.e. parallel to the axle of the vehicle).

More than one light-emitting means could be provided, but preferably only one is provided such that the light therefrom spans the entire tread width treaded rolling surface of the tyre; it is desirably Alternative patterns, such as an elongate grid of spots or line segments, or an irregular (e.g. pseudo random) elongate arrangement of straight or curved lines or spots, may be used.

It is preferred (but not essential) that the previously-described sheet of light is inclined at an angle to a radius of the tyre intersecting said pattern; in particular, it may be inclined at an angle of between 5 and 60 degrees, e.g. 45 degrees. Thus the sheet of light is preferably not perpendicular to the surface of the tyre at any point within the pattern. In such embodiments, so long as the tyre is not entirely bald (i.e. devoid of any tread), the "line" will not, in fact, be straight (or typically even continuous) across the surface of the tyre, even though it appears as such from the viewpoint of the light-emitting means. This is because it will strike a peak of the tread pattern at a different rotational position on the tyre surface from the point at which it will strike an adjacent trough of the tread pattern. From viewpoints other than that of the light source, such discontinuities in the pattern will typically be visible, and information relating to these discontinuities can be used to measure the tread.

It is not essential however for the sheet of light to be inclined to the normal to the tangential surface of the tyre; i.e. the light could be directed along the normal to the surface of the tyre at a point where it meets the tyre. Although all points of the pattern will then be at the same rotational position on the tyre's surface, when the diffuse reflections of the pattern of light are viewed from an angle to the radius, the line will appear not to be straight (or necessarily even continuous), due to the various reflections occurring at different radial distances from the centre of the tyre, due to the presence of the tread pattern. Because tyre rubber typically has a very rough surface at a microscopic level, light is principally reflected diffusely in many directions, rather than specularly in one direction, thus readily enabling viewing from angles other than the precise angle of specular reflection, thus allowing the tread to be measured.

The measured information relating to the tyre's tread could be used for a number of different purposes. Preferably it is used to determine the depth of the tread pattern around the tyre, thereby allowing easy checking of compliance with legal requirements for example. However it can also be used, for example, to determine tyre wear patterns which can be used to determine whether tyres are correctly inflated, whether the wheel is properly balanced or cambered, whether the vehicle suspension is worn, whether the vehicle is being driven aggressively, or whether the tyre has suffered any unusual damage.

The light-emitting means may project a pattern of light directly onto the rolling surface of the tyre or via one or more light-guiding means such as a mirror or prism.

The light-emitting means preferably comprises a laser. The laser beam may be deflected by a moving component in order to trace said pattern over a period of time, but is preferably shaped by a static light-shaping component, such as a cylindrical lens.

The portable sensor unit may comprise a light-guiding means to direct light to or from the surface of the tyre. In preferred embodiments, the sensor unit comprises a mirror arranged to direct light reflected from said pattern to said first or second imaging means. In some embodiments, the sensor unit also comprises a mirror arranged to direct light from the light-emitting means onto the rolling surface of the tyre. A single mirror may act in both these roles but the two mirrors are preferably distinct.

The light-guiding means may comprise a single mirror arranged to reflect light from the light-emitting means onto the rolling surface of the tyre or may comprise two or more mirrors arranged to cooperate to achieve this. Similarly, the light-guiding means may comprise a single mirror to reflect light scattered from said pattern of light towards the first or second imaging means or may comprise at least two mirrors arranged to cooperate to achieve this.

In some preferred embodiments, the sensor unit comprises a mirror at least half as long as the length of the elongate pattern of light; more preferably at least 90% of the length of the pattern; and most preferably substantially the same length as the pattern. In some embodiments it could be longer than the elongate pattern. The mirror may be any suitable reflecting surface, such as polished metal plate, a silvered-glass mirror or a silvered acrylic mirror.

The mirror is preferably elongate and arranged so as, in use, to be substantially parallel to the elongate pattern of light. The light-guiding means may comprise two or more substantially-parallel elongate mirrors arranged to cooperate to reflect light to and/or from the surface of the tyre. In some especially preferred embodiments, the light-guiding means comprises three parallel, elongate mirrors; the first arranged to direct light from the light-emitting means to the surface of the tyre and the other two arranged to cooperate with each other to direct light from the tyre surface to the imaging means. These three mirror are preferably all substantially the same length as the pattern of light emitted in use, and are preferably all aligned such that their ends lie in two common planes perpendicular to their axes.

The applicant has found a single mirror to be particularly advantageous when reflecting light from the tyre surface towards the imaging means since this allows the sensor unit to be compact but avoids excessive deterioration of the signal received by the imaging means, which might otherwise occur if light were reflected between multiple reflecting surfaces.

Nonetheless, in some embodiments, the light-guiding means comprises at least two reflecting surfaces in the field of view of the first imaging means. The first is preferably arranged to reflect light received directly from the surface of the tyre directly to the first imaging means; the second is preferably arranged to reflect light received indirectly from the surface of the tyre (e.g. via a third reflecting surface) to the first imaging means. Preferably the first reflecting surface is substantially centred within the field of view of the first imaging means in a direction parallel to the wheel axis. Preferably the second reflecting surface is located to one side of the field of view of the first imaging means in a direction parallel to the wheel axis. Preferably a fourth reflecting surface is located symmetrically to the second reflecting surface about a central axis in the field view perpendicular to the wheel axis, and is preferably arranged to reflect light received indirectly from the surface of the tyre (e.g. via a fifth reflecting surface) directly to the first imaging means.

The second imaging means may comprise a further five (or fewer) reflecting surfaces acting similarly to those described above with respect to the first imaging means. In embodiments having a plurality of reflecting surfaces, a number of said surfaces (especially a pair) may advantageously be formed from a single faceted reflector. The reflecting surfaces are preferably planar, but some or all of them may be curved.

The first and second regions may be completely distinct from each other or may overlap. Advantageously, the sensor unit comprises a third imaging means arranged in use to image a third region of the rolling surface of the tyre. Preferably, for any given position of the portable sensor unit relative to the tyre, the imaging means and any light-guiding means are arranged so that each imaging means images the tyre surface from a unique viewpoint for that position.

The third region preferably consists of at least a part of the first region and at least a part of the second region; in which case the third region is imaged by at least two imaging means. In this way, the likelihood of the pattern of light in the third region not being imaged by any of the imaging means due to blind-spots (i.e. locations where a tread protrusion blocks the passage of light to any particular imaging-means) is reduced.

Whatever light-guiding means are or are not used, optionally the sensor unit comprises means to image one or both of the shoulders or sidewalls of the tyre—i.e. to receive light from a point on the tyre other than the main tread region. Preferably this comprises a light-guiding arrangement arranged to direct light towards the previously-described imaging means. This light-guiding arrangement may comprise one or more mirrors. Preferably two such light-guiding arrangements are provided, one for each side of the tyre. In one embodiment, the sensor unit comprises two mirrors located adjacent opposite ends of the unit and arranged to direct light from respective shoulders or sidewalls of the tyre to imaging means.

Tread depth information may, in some circumstances, be determined from the shoulder of the tyre. However, preferably, imaging of the shoulder and/or sidewall is used to detect irregularities in the tyre, such as bulges or tears in the sidewall. In such cases, it may not be necessary for the elongate pattern of light to extend beyond the tread region.

The sensor unit may comprise any number of imaging means; e.g. two, three, four, five or more. In one set of embodiments the imaging means are arranged such that every point of the pattern may be imaged by at least two imaging means.

The imaging means may comprise a line of photosensitive cells but preferably comprises a camera arranged to generate two-dimensional representations of a scene. The camera preferably comprises a focusing lens and an electronic sensor such as a CCD or CMOS sensor.

The sensor unit preferably comprises a handle which preferably protrudes from an end of the portable sensor unit and is preferably elongate, thus facilitating insertion, by a human user, of the portable sensor unit between the rolling surface of the in situ tyre and a wheel arch of the vehicle.

Preferably the electronic imaging sensor is situated, in use, between the plane of the outside sidewall of the tyre and the plane of the inside sidewall of the tyre (i.e. within the space between the tyre and the vehicle's wheel arch). This is preferably accomplished by the portable sensor unit comprising a plurality of mirrors arranged to direct light along a path from the surface of the tyre to the image sensor. To further improve compactness of the portable sensor unit, at least one of the mirrors may be faceted; e.g. consisting of two or more non-coplanar reflective faces; however this is not essential.

The applicant has recognised that this feature is new and inventive in its own right, and thus, from a further aspect, the invention provides a portable sensor unit for determining tread depth of a tyre mounted on a wheel installed on the axle of a vehicle, the tyre being situated beneath a wheel arch, wherein the sensor unit comprises a light source, a plurality of mirrors and an electronic imaging sensor, the light source, mirrors and imaging sensor being arranged such that, in use, light travels from the light source to the surface of the tyre, and from surface of the tyre, via one of said mirrors, to the electronic imaging sensor, wherein the imaging sensor and at least one of said mirrors are, when the unit is in use, situated between the tyre and the wheel arch.

From another aspect, the invention provides a portable sensor unit for determining tread depth of a tyre mounted on a wheel installed on the axle of a vehicle, wherein the sensor unit comprises a light source, a plurality of mirrors and an electronic imaging sensor, the light source, mirrors and imaging sensor being arranged such that, in use, light travels from the light source to the surface of the tyre, and from surface of the tyre, via one of said mirrors, to the electronic imaging sensor, wherein the imaging sensor and at least one of said mirrors are arranged such that, when the unit is in use, they are situated between the two planes containing the respective sidewalls of the tyre.

Thus, unlike previously known arrangements, a portion of the tyre's surface may be imaged with an electronic imaging sensor (e.g. a CCD or CMOS sensor) located in close proximity to the tyre surface. Compared with an arrangement in which an imaging sensor is located elsewhere the optical path between the tyre's surface and the imager can be shorter, thus resulting in a clearer image with no blind spots. The optics may also be simpler, resulting in a clearer image and a potentially more conveniently shaped, sized and/or weighted sensor unit.

From a further aspect, the invention provides a system comprising such a portable sensor unit according to either of these aspects and further comprising processing means arranged to receive image information from said imaging sensor and to process said information to perform a measurement of the tread of the tyre. Again the processing means could be in the sensor unit or separate therefrom.

The invention also extends to a method comprising use of such a system.

Some tyre sidewalls may not be substantially planar, but curved. A plane containing the sidewall should therefore be understood to mean the axially-outermost plane which touches the tyre and is perpendicular to the tyre's axis of rotation.

Optional features of other aspects of the invention are, where appropriate, preferred features of these aspects also. In particular, the portable sensor unit preferably comprises first and second imaging means, the first imaging means comprising the aforesaid electronic imaging sensor, and the second imaging means comprising a further electronic imaging sensor. The plurality of mirrors are preferably arranged according to one or more of the previously described configurations.

In any of the above aspects, there may be more than one light-emitting means, preferably arranged to emit coplanar respective sheets of light. Advantageously, the light-emitting means are arranged to project respective line segments such that an end of each line segment abuts or overlaps the end of an adjacent line segment, thus forming an extended line of light across the tyre (from the viewpoint of a point in the plane of the sheets of light).

In some preferred embodiments the portable sensor unit comprises the same number of light-emitting means as imaging means. Preferably each light-emitting means is located proximate or adjacent a corresponding imaging means. The combination of one light-emitting means and one imaging means may thus be considered as forming a single optical unit or module.

Preferably the portable sensor unit comprises a plurality of optical modules each comprising a light-emitting means and an imaging means. In some embodiments, the sensor unit comprises a first optical module comprising the aforesaid light-emitting means and said first imaging means, and a second optical module comprising a further light-emitting means and said second imaging means.

The sensor unit may comprise two, three, four or more such optical modules. The optical modules are preferably arranged linearly within the portable sensor unit along a line defining an axis for the sensor unit (albeit that the modules may overlap one another). Preferably the optical modules are similar or identical to one another (optionally ignoring a reflection in the arrangement of their components; i.e. allowing for left- and right-handed modules). An arbitrary number of optical modules may be used in combination, depending on the technical requirements (e.g. dimensions or optical resolution) of the portable sensor unit. Typically there will be some components of the sensor unit that are common across the modules, such as a power supply. In some embodiments, the portable sensor unit may comprise a common light source and optical guides (e.g. fibre optics) to convey light from the common light source to each optical module. In such an arrangement, references herein to the light-emitting means of each optical module are not to be understood as including the common light source, but rather to comprise those optical components (lenses, mirrors, etc.) that are repeated across each module.

Such a modular arrangement of the optics within the portable sensor unit allows for straightforward customisation of the length of the sensor unit during production, allowing sensor units to be efficiently assembled for use on different widths of tyres. Alternatively or additionally, a finished sensor unit may comprise module receiving means arranged to receive an optical module (or a plurality of optical modules) at a post-production stage; in this way the sensor unit may be adapted in the field to provide a longer or shorter line of optical modules to cater for different tyre widths.

The applicant has recognised that such a modular approach is new and inventive in its own right, and thus, from a further aspect, the invention provides a sensor unit for determining tread depth of a tyre installed on a vehicle, the sensor unit comprising a plurality of optical modules, each optical module comprising a light-emitting means arranged to project a pattern of light onto the rolling surface of the tyre and an imaging means arranged in use to image a region of the rolling surface of the tyre containing at least a part of said pattern.

Optional features of other aspects of the invention are, where appropriate, preferred features of this aspect also.

The applicant has recognised that achieving accurate alignment of the portable sensor unit with respect to the tyre can be important when using apparatus in accordance with the invention. In some embodiments, a human operator must maintain the portable sensor unit at a given angle to the tyre's rotational axis in order to acquire tread depth information along a given line spanning the width of the tyre. Accurate alignment is particularly important when the device is used to obtain a sequence of linear, two-dimensional depth readings, which may then combined into a three-dimensional representation of the tyre surface, by being rolled around the surface of the tyre. In such cases, it is particularly important that the orientation of each linear reading be known; and it is preferred that the lines are all substantially parallel to one another and parallel to the tyre axis, since this simplifies the data processing steps.

In some embodiments a plurality of wheels and/or rollers is provided on the sensor unit. Preferably these are provided so as to be circumferentially spaced around the tyre in use. This assists an operator in maintaining a proper alignment between the sensor unit and the tyre as the former is passed over the latter. In some embodiments additional alignment means could be provided. For example rollers or wheels positioned to contact a sidewall of tyre could be provided.

The sensor unit is thus preferably arranged such that the light-emitting means emits light rays that do not all lie in a single plane. In other words, light is emitted not simply as a single "sheet of light". Particularly preferably, light is emitted in a two or more distinct "sheets". These sheets may advantageously both be generated by a single light-emitting means. They may meet or intersect at a point or line adjacent or within the light-emitting means. Preferably, from the viewpoint of the light-emitting means, the pattern of light projected by the light-emitting means comprises two lines, both parallel to the axis of the tyre in use and spaced a distance apart from each other.

The system is preferably able simultaneously to determine information relating to the tread pattern of the tyre at a plurality of first points lying in a first plane and at a further plurality of second points lying in a second plane. Preferably each plane passes through the sensor unit and is parallel to the axis of the sensor unit; preferably each point of the first plurality of points corresponds to a unique point from the second plurality of points, the two points being at the same lateral position along the axis of the sensor unit as each other.

If the portable unit is being moved directly around the rolling surface of the tyre with the axis of the unit parallel to the tyre axis, the location of the first points on the tyre surface at a first moment in time (when the unit is in a first position) will be the same locations as those occupied by the second points at a subsequent moment in time (when the unit is in a second position). Information relating to the tread pattern of the tyre can be used to detect this correspondence between the points (e.g. by noting that the depth of tread at any fixed point does not change). If the speed at which the sensor unit is moved between the first and second positions is known, and the distance between the first and second sets of points on the tyre surface is known, the system may be arranged to verify that the unit is aligned parallel to the tyre axis and moving accurately circumferentially around the tyre by checking the correspondence of the two sets of points.

On the other hand if the sensor unit is not aligned parallel to the tyre axis, it will either nonetheless follow a circumferential path around the tyre, or a helical trajectory about the axis of the tyre. In the second case, the sensor unit will eventually run off the edge of the tyre, so the user will have to correct the path before this happens. However it would be useful to be able to detect this situation before that happens.

When the sensor unit is not parallel to the tyre's axis at least some of the first points in the first plane will correspond to second points in the second plane with a time offset (dependent on the separation of the lines of light striking the tyre and the speed of circumferential rotation of the sensor unit); and an axial offset, dependent on the angle of the sensor unit. By matching tread pattern features from the two sets of data (e.g. using a known pattern-matching algorithm), an estimate of the angle may be achieved.

If an angle offset is detected, e.g. as set out above or by other means, this could be used to give real-time feedback as to the alignment or misalignment of the sensor unit to the operator by any appropriate means; e.g. an audible, visual or haptic signal. This allows an operator to ensure that the sensor unit is properly positioned and moved so as to maximise the quality of the data it records. The feedback could be simply in the form of a warning of misalignment or confirmation of alignment; or it could be quantitative to facilitate correction. Alternatively the determined angle could be used to compensate for the offset angle automatically by applying a suitable offset to the recorded data. Of course a combination of these might apply, e.g. correcting automatically for small offsets, but warning if the offset is too large.

The applicant has recognised that determining misalignment of a tyre tread measuring device in use is new and inventive in its own right, and thus, from a further aspect, the invention provides a system for performing a measurement of the tread of a tyre mounted on a wheel installed on a vehicle axle, the system having a portable sensor unit comprising:
light-emitting means arranged to project at least two elongate patterns of light onto the rolling surface of the tyre;
imaging means arranged in use to image said elongate patterns of light; and
tyre engaging means arranged to locate the sensor unit in use against the tyre;
the system further comprising processing means arranged to receive data from said imaging means and to process said data to determine an angular misalignment between the tyre and the sensor unit by matching pattern features of the data from said first elongate pattern of light with pattern features of the data from said second elongated pattern of light.

Although in the description above some aspects of the invention have a portable sensor unit, this is not considered essential in all aspects of the invention. For example the sensor unit could be provided on a mechanically operated arm or could be temporarily or permanently installed on the vehicle in sight of the tyre surface—e.g. mounted inside the wheel arch. In such arrangements the sensor unit would not touch the tyre. For example a number of sensor units mounted in each wheel arch might communicate with a central processor unit either mounted elsewhere on the vehicle or remotely.

When viewed from a further aspect the invention provides a system for performing a measurement of the tread of a tyre mounted on a wheel installed on a vehicle axle, the system having a sensor unit comprising:
light-emitting means arranged to project an elongate pattern of light onto the rolling surface of the tyre; and
first and second imaging means arranged in use to image respective first and second regions of the rolling surface of the tyre, the first region extending further towards the inner sidewall of the tyre than does the second region;
the system further comprising processing means arranged to receive data from said first and second imaging means and to process said data to perform said tread measurement.

The invention extends to a sensor unit for use in performing a measurement of the tread of a tyre mounted on a wheel installed on a vehicle axle, the sensor unit comprising:
light-emitting means arranged to project an elongate pattern of light onto the rolling surface of the tyre; and
first and second imaging means arranged in use to image respective first and second regions of the rolling surface of the tyre, the first region extending further towards the inner sidewall of the tyre than does the second region.

The invention extends to a method of performing a measurement of the tread of a tyre mounted on a wheel installed on a vehicle axle comprising:
projecting an elongate pattern of light onto the rolling surface of the tyre; and
imaging first and second regions of the rolling surface of the tyre with said first and second imaging means respectively, the first region extending further towards the inner sidewall of the tyre than does the second region.

A portable sensor unit as previously described provides many advantages over the prior art, and is well suited to performing relatively-thorough inspections of a tyre on a vehicle. It is envisaged that such inspections might typically be carried out by a fleet operator once every 6 or 13 weeks, for example, typically when the vehicle is in a workshop.

It may additionally be desirable to conduct more-frequent, interim checks, between these workshop inspections. Such checks may, for example, be conducted daily by the driver of the vehicle. It is acceptable for these checks to be less thorough than a quarterly inspection would be, but it is nonetheless desirable that they alert the user to a proportion of deficiencies that are present. Such checks are advantageously relatively quick to conduct. It is also desirable if they can be performed outside a workshop setting. Typically, in practice, such checks are simple, visual inspections by eye of the visible surfaces of the tyre by the driver. A more reliably yet quick approach to determining inadequate tread depth is desired.

Methods are known where a vehicle drives over an optical inspection device located below ground level, or built into a platform or ramp. Such an arrangement facilitates the automated inspection of the tyre's footprint. Unlike the portable device described above, such an arrangement does not readily permit inspection around a substantial proportion of the tyre's circumference; however, the inspection process can be fast and need not require additional human involvement beyond the driver's driving his vehicle over the inspection area.

A problem with known methods, however, is that they employ physically large apparatus. A substantial civil-engineering effort is required to sink such apparatus into the ground, since a deep hole must be dug to accommodate it. Alternatively, where ramps are employed, these are bulky and require the vehicle to lifted high off the ground, which makes them harder to use and less energy-efficient, with an increased danger from the vehicle falling off the ramps.

The Applicant has realised that similar approaches to those described in preceding aspects of the invention relating to portable devices may also be employed to advantage to provide a drive-over sensor unit that is more compact than known arrangements, thereby overcoming these problems.

Thus, from a further aspect, the present invention provides an apparatus for measuring the tread of a tyre on a vehicle comprising:
  light-emitting means arranged in use to generate an elongate pattern of light;
  first reflecting means arranged to reflect light from the light-emitting means onto the rolling surface of the tyre;
  imaging means arranged to image a region of the rolling surface of the tyre; and
  second reflecting means arranged to reflect light from the rolling surface of the tyre towards the imaging means.

Sending light along an indirect path to the tyre surface and receiving it back along an indirect path enables the light-emitting means and imaging means to be positioned more conveniently so as to produce a more compact overall design than would be the case if the light-emitting means and imaging means had to be located in appropriate positions along direct paths to and from the tyre surface.

The invention extends to a method of measuring the tread of a tyre on a vehicle comprising:
  generating an elongate pattern of light from light-emitting means;
  reflecting light from the light-emitting means onto the rolling surface of the tyre;
  reflecting light from the rolling surface of the tyre towards imaging means; and
  imaging a region of the rolling surface of the tyre.

This aspect of the invention is applicable to a hand-held instrument but in another set of embodiments Preferably the method comprises imaging the tyre while the tyre is located above the apparatus. This could be done with the tyre moving—i.e. while the corresponding is driven over the apparatus, or with the tyre stationary—i.e. where the wheel is driven onto the apparatus and driven off again after imaging has taken place. Both of these are to be contrasted with rolling roads in which a wheel is rotated whilst the vehicle remains stationary. The apparatus could be designed to be situated substantially or completely below the level of the ground or other driving surface. Preferably therefore the light is arranged to be reflected upwards towards the surface of the tyre. The light may be reflected at any angle to the vertical, but is preferably reflected at an angle of less than 45 degrees to the vertical; e.g. less than 10 or 20 degrees to the vertical; or even substantially vertically.

Whatever the relative locations of the apparatus and tyre, it is preferred that the light is reflected so as to strike the tyre surface at an angle of less than 45 degrees to the normal; e.g. less than 10 or 20 degrees to the normal; or even substantially normally.

Preferably the angles at which light forming the pattern on the tyre surface reaches the imaging means differ from the angle or angles at which light from the light-emitting means reaches the tyre surface. This difference of angles facilitates the obtaining of tread depth information as previously explained.

The light may be reflected through a window, for example of glass or acrylic, towards the rolling surface of the tyre. Such a window can protect the apparatus from damage. In some embodiments the window is an integral part of the apparatus. When a window is provided, the light preferably passes through it both travelling to the tyre surface and travelling from the pattern on the tyre towards the imaging means. The apparatus may comprise a housing, enclosing the optical components, the housing preferably comprising the window.

In some embodiments the apparatus comprises a ramp for lifting a wheel of the vehicle; it may have two ramps: an on ramp and an off ramp. Such embodiments need not then be installed below ground level, but can sit on the ground and elevate the vehicle above the optics by means of the ramps.

In some embodiments the apparatus comprises one or more rollers arranged to engage the vehicle tyre. Such a rolling-road arrangement allows the entire circumference of the tyre to be imaged. However it requires a mechanism for getting the car onto and off the apparatus, and can for this reason be less convenient than the preferred embodiments.

In preferred embodiments, some or all of the light-emitting means, reflecting means and imaging means are located predominantly, substantially or wholly below a driving surface such as ground level.

Features of the light-emitting means, reflecting means and imaging means, as well as of methods and apparatuses more generally, already described with reference to the earlier aspects of the invention may be features of this aspect also, wherever appropriate.

In one particularly preferred arrangement, the apparatus comprises a laser arranged to project an elongate pattern of light onto the tyre surface, two cameras, and two elongate mirrors arranged, in use, to be aligned substantially parallel to the vehicle's axles, wherein the first of the mirrors is arranged to reflect light from the laser to the tyre surface, and the second is arranged to reflect light from respective regions of the tyre surface to the two cameras. A third elongate mirror, parallel to the others, may also be provided between to reflect light between the tyre surface and the second mirror.

In some situations, two or more similar apparatuses are provided, for the substantially-simultaneous imaging of a plurality of tyres. In other embodiments, however, the elongate pattern of light is, in use, projected onto two or more tyres from a single apparatus. These may be tyres at the same end of an axle, or they may be tyres at opposite ends of an axle. In order to generate a longer elongate pattern of light, more than two imaging means may be employed; for example, 8 or 12 or more. A longer elongate pattern permits greater latitude in the positioning of the vehicle relative to the apparatus.

The apparatus may be arranged to measure tread depth only when a vehicle is stationary or moving slowly (e.g. below 5 or 15 kilometers per hour), but it could be arranged to measure tread depth of vehicles passing the apparatus at relatively high speed (e.g. 50 or 100 kilometers per hour or more).

BRIEF DESCRIPTION OF THE DRAWINGS

A preferred embodiment of the invention will now be described, by way of example only, with reference to the accompanying drawings, in which:

FIG. 20 is a view from beneath of the embodiment of FIG. 19.

DETAILED DESCRIPTION

Figure 1:
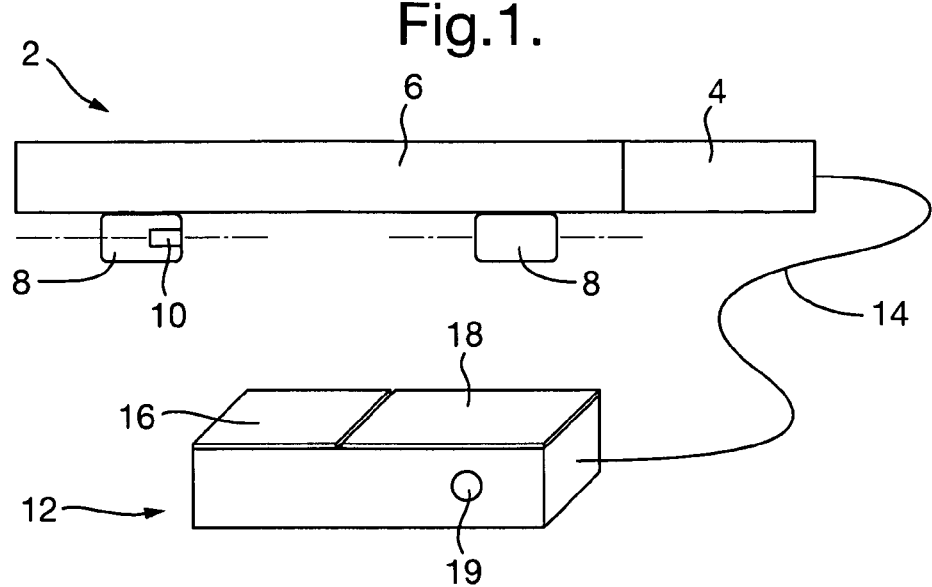
FIG. 1 is a schematic diagram of a tread-depth determination system according to the present invention comprising a portable sensor unit and a processing unit.

FIG. 1 schematically depicts a tyre tread-depth determination system comprising a portable sensor unit 2 having a cylindrical handle 4 protruding from an elongate body 6. Near each corner of the lower face of the main body 6 is mounted a roller 8 (only two of the four rollers are visible here) arranged to rotate about an axis (indicated on FIG. 1 by a dashed line) parallel to the axis of the main body. At least one of the rollers 8 comprises a rotary encoder 10 arranged to count full or partial revolutions of the roller 8.

Running along the length of the underside of the body 6, between the rollers 8, is an elongate, rectangular, transparent window (not visible in FIG. 1) arranged to permit the passage of light into and out of the inside of the body 6.

The portable sensor unit 2 is connected to a controller unit 12, which may be stationary but is preferably portable, by a wire 14. The wire 14 allows communication between the portable sensor unit 2 and the controller unit, and, if the sensor unit 2 does not have its own power supply, supplies electrical current to the sensor unit 2 from the controller unit 12. The controller unit 12, if portable, preferably comprises a battery or other suitable internal power supply (not visible).

In alternative embodiments a wireless connection could be employed; the sensor unit could store data for later download to a computer; or suitable on-board processing means could be provided.

The controller unit 12 has a graphical display 16 for displaying a graphical user interface and presenting information and results to a human operator; and a keyboard 18 for receiving control commands from a human operator. It also has an internal speaker (not visible) arranged to emit sounds through a grille 19.

Figure 2:
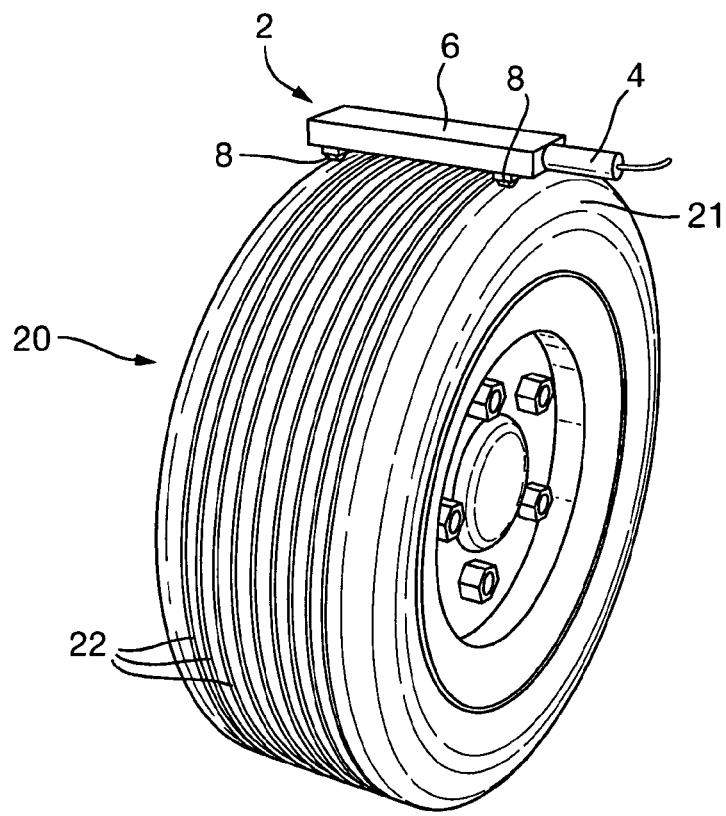
FIG. 2 is a perspective diagram of the portable sensor unit and a vehicle tyre.

FIG. 2 shows, in perspective view, the portable sensor unit 2 in position against a tyre 20. The rollers 8 are in contact with the surface of the tyre 20 and the axis of the body 6 of the sensor unit 2 is oriented across the width of the tyre 20; i.e. parallel to the axis of rotation of the tyre. The body 6 of the sensor unit 6 is of a length equal to, or slightly larger than, the width of the tyres on which it is typically to be used. In this way the handle 4 protrudes beyond the outer sidewall 21 of the tyre 20 and the portion of the body 6 between the rollers 8 spans the treads 22 of the tyre 20.

Figure 3:
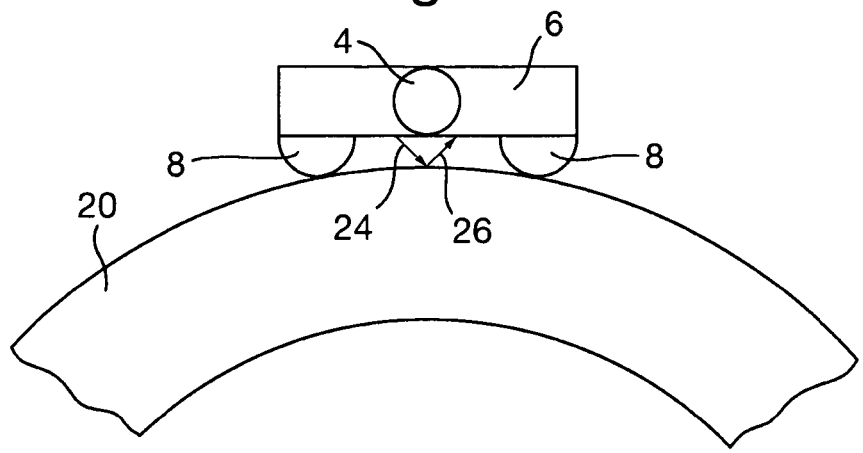
FIG. 3 is a side projection of the portable sensor unit and tyre of FIG. 2.

FIG. 3 shows a side elevation of the portable sensor unit 2 in position against a tyre 20. A "sheet of light" 24 is shown travelling from the body 6 of the sensor unit 2 to the surface of the tyre 20; reflected light rays 26 are shown travelling back from the surface of the tyre to the body of the sensor unit. Both the outgoing and return light 24, 26 passes through the window (not visible) in the bottom of the sensor unit. The sheet of light 24 is shown inclined at an acute angle to the flat base of the body 6 of the sensor unit 2, but it may alternatively be perpendicular.

Figure 4:
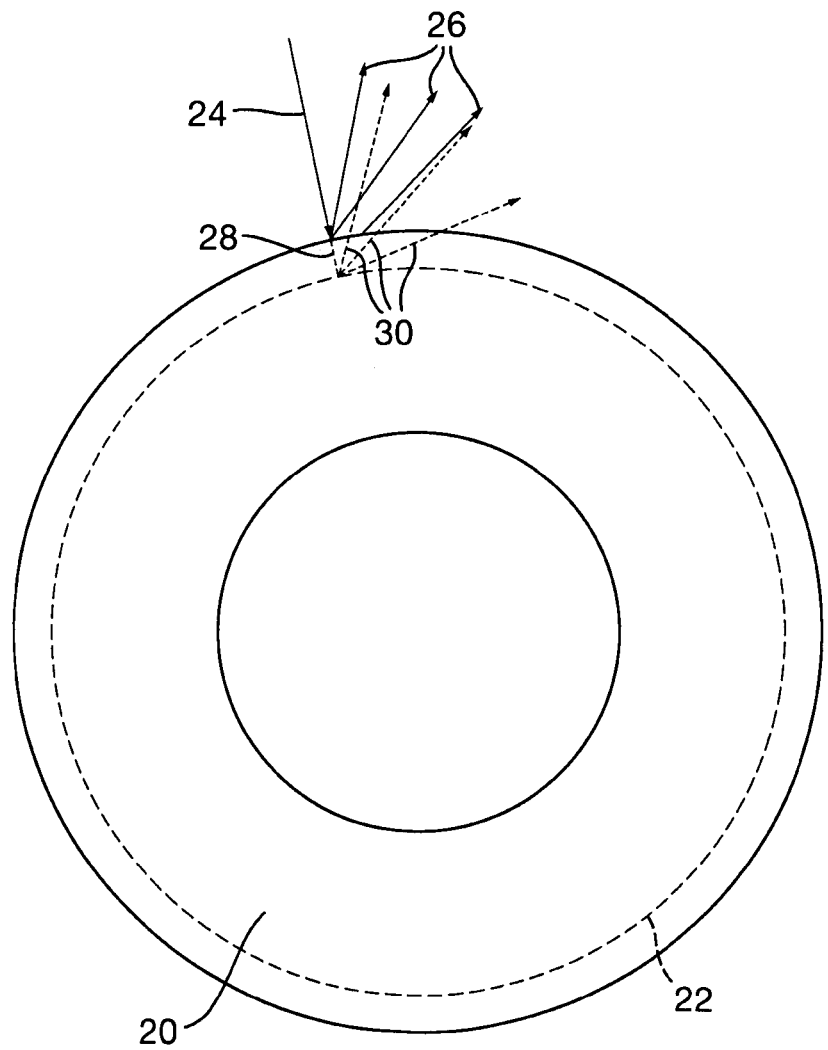
FIG. 4 is a schematic side view of a tyre showing possible paths of light reflecting off the tyre.

FIG. 4 shows, not to scale, a schematic side view of a tyre 20 to illustrate a principle by which the present embodiment of the invention determines tyre tread depth. The tyre 20 comprises a tread 22 consisting of grooves in the tyre, the maximum depth of which is indicated by the dashed circle). Some rays from a sheet of light 24 directed towards the tyre 20 will strike the outermost surface of the tyre 20 and be reflected diffusely along various first reflected paths 26. Other rays 28 of the sheet of light 24 (at a different transverse position across the width of the tyre) will travel into the tread 22 of the tyre 20 and strike a lower surface of the tread pattern. These rays will then be diffusely reflected along a variety of second reflected paths 30.

Figure 5:
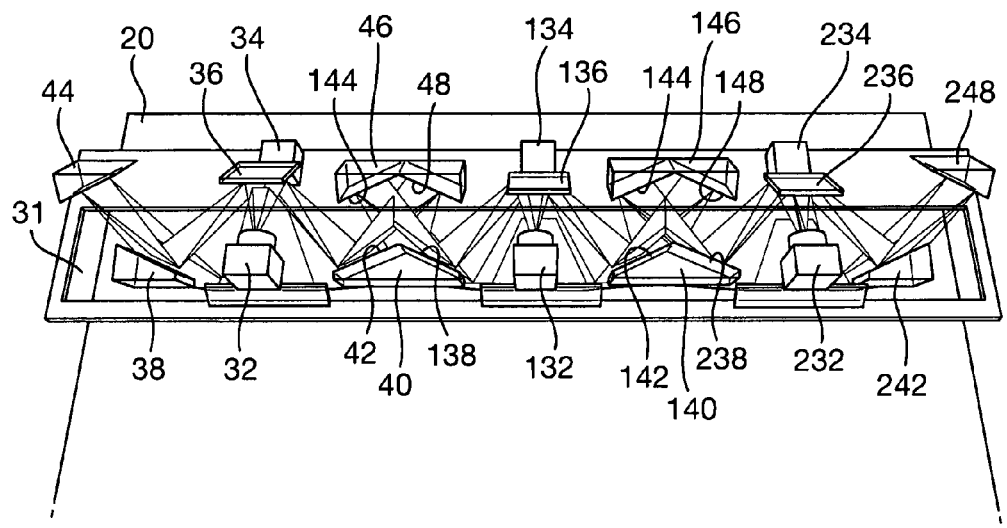
FIG. 5 is a perspective drawing of an internal portion of the portable sensor unit.

FIG. 5 shows an internal portion of the portable sensor unit 2 situated above the surface of the tyre 20, along with an indication of light paths between the various optical elements in use. The previously mentioned elongate viewing window 31 may be seen in the face of the sensor unit facing towards the tyre surface and spanning at least the width of the tread pattern of the tyre. Three imaging modules, each comprising a camera 32, 132, 232 and set of mirrors, are spaced in a row above the elongate window. Between them, they are able to image the full width of the tyre tread.

The first imaging module comprises a first camera 32 on one side of the viewing window 31, situated opposite a laser line generator 34 that is arranged to shine a sheet of light through the viewing window 31 in order to project a line segment onto the tyre surface, the line segment being parallel to the elongate viewing window and to the rotational axis of the tyre, and having the camera 32 approximately at its midpoint.

Directly across the viewing window from the camera 32 is a central mirror 36 which is angled down towards the tyre surface so as to reflect light from a central portion of the line segment towards the camera 32. Thus an image of the central portion of the line segment is visible in a central section of the camera's field of view.

This central mirror 36 also reflect light to the camera from a camera-side left mirror 38 and a camera-side right mirror 42 (which forms half of a faceted mirror unit 40 located half-way between the first camera 32 and a second camera 132 immediately to its right). These camera-side mirrors 38, 42 are on the same side of the viewing window 31 as the camera. The camera-side left mirror 38 cooperates with an opposite-side left mirror 44 which is situated beyond the edge of the tread pattern of the tyre 20 on the opposite side of the viewing window 31 to the camera 32. It is angled down towards the tyre and angled in towards the tread pattern. These two left mirrors 38, 44 together direct light from a left portion of the line segment towards the camera 32, such that an image of the left portion is formed in a left section of the camera's field of view.

Similarly, the camera-side right mirror 42 cooperates with an opposite-side right mirror 48 to direct light from a right portion of the line segment towards the camera 32. In this instance, however, the opposite-side mirror 48 is not located beyond the edge of the tread pattern of the tyre, but rather forms half of an opposite-side facetted mirror unit 46, the other half of which is an opposite-side left mirror 144 in respect of the second camera 132 immediately to the right of the first camera 32.

The arrangement of the laser line generator 34, camera 32 and five mirrors 36, 38, 42, 44, 48 forms an optical module, of which the depicted embodiment has a total of three. The second camera 132 and a third camera 232 are part of respective second and third optical modules having very similar arrangements of mirrors as described above with reference to the first camera 32—the corresponding components are numbered similarly, but with a prefixed 1 and 2 respectively. The only difference is due to the effect of the edge of the tyre 31, meaning that the mirrors at the extreme left and right edges of the set of the optical modules are not formed from facetted mirrors, but are single wedge mirrors.

The laser line generators 34, 134, 234 are arranged to project a complete line across the width of the tyre (at least from a viewpoint coincident with one of the line generators—from other viewpoints, the line may be fragmented due to the varying heights of the tread pattern). The optical modules are arranged to image, between them, the entire length of the projected line.

Figure 6:
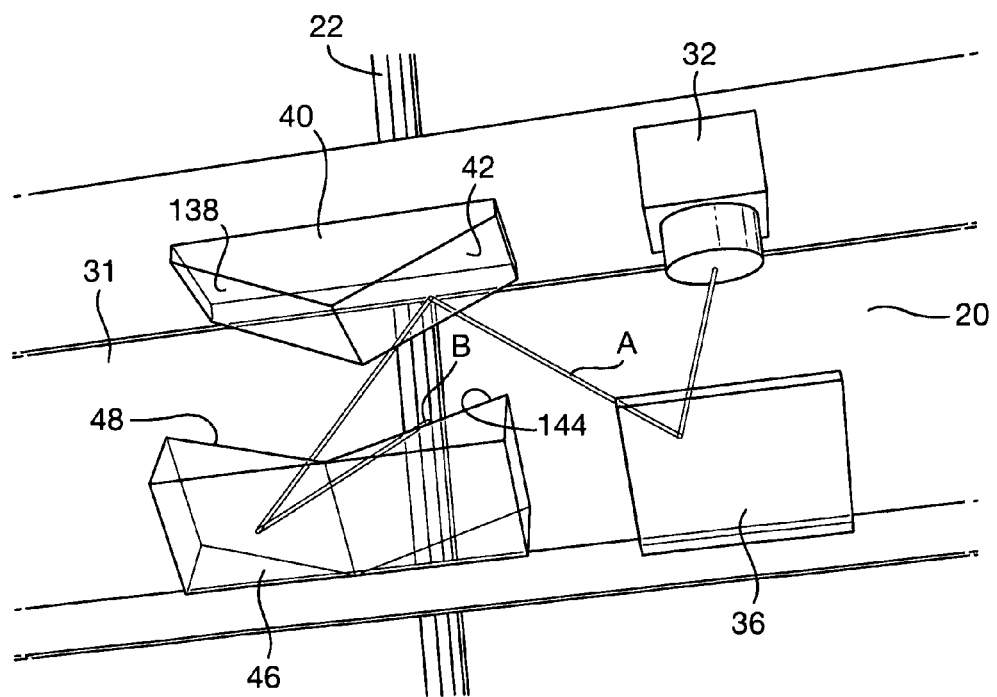
FIG. 6 is a close-up perspective drawing of part of the internal portion of FIG. 5, illustrating the passage of a single beam of light through the optics.

FIG. 6 shows a close-up view of the first optical module described above with reference to FIG. 5, and depicts by a line A the passage of a beam of light through the optics. Light from the laser line is diffusely scattered from a point B on the tread 22 of the tyre 20. Some passes through the viewing window 31 in the portable sensor unit 2 and strikes the opposite-side right mirror 48 of the facetted mirror unit 46. The light is them reflected towards the camera-side right mirror 42 which is part of the facetted mirror unit 40 located adjacent to the camera 32. This reflects it to the central mirror 36, which finally reflects it into the camera 32. Thus, the laser line pattern in the vicinity of this part of the tread 22 will be visible in a right section of the camera's field of view. Because the angle of viewing the laser line is not the same as the angle of incidence of the sheet of light from the laser line generator 34, the image will be of an uneven or broken line, with the degree of unevenness being related, in a quantifiable way, to the depth of the tread 22 of the tyre.

Figure 7:
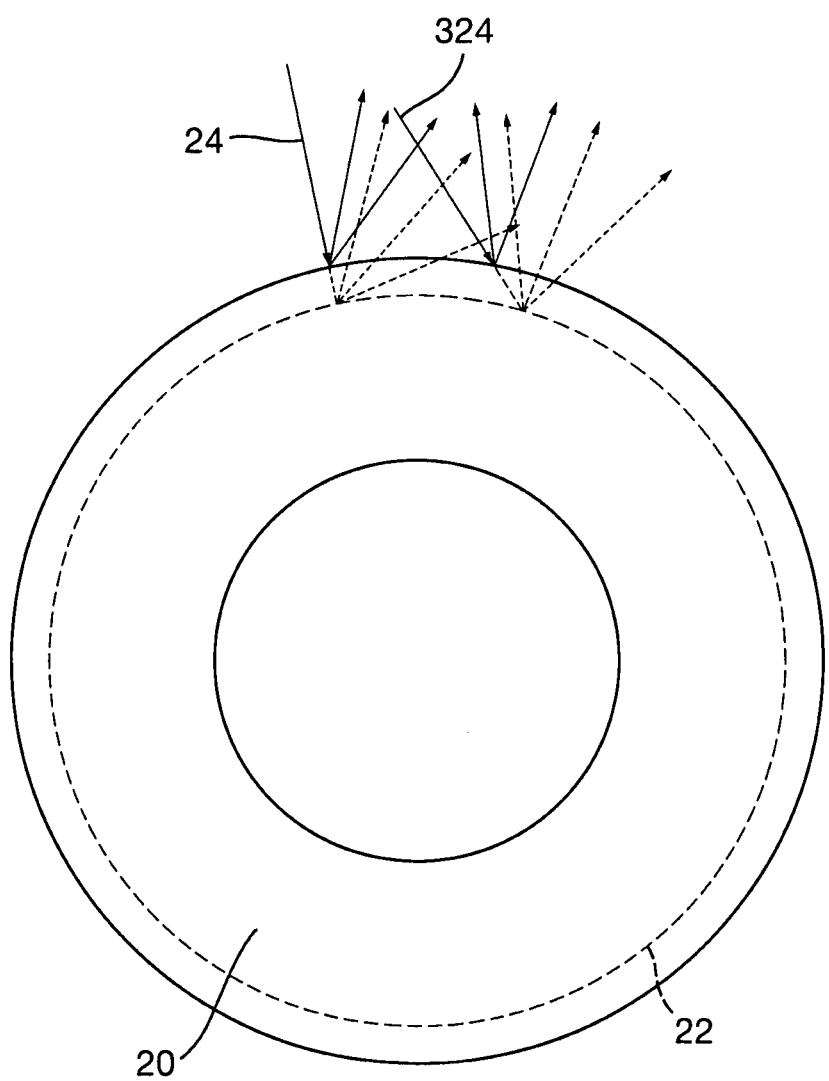
FIG. 7 is a schematic side view of a tyre showing possible paths of light reflecting off the tyre from two separate incident beams.

FIG. 7 shows, not to scale, a schematic side view of a tyre 20 showing rays from a sheet of light 24 as in FIG. 4. However, here further rays from a second sheet of light 324 are also shown. This second sheet of light 324 is inclined at an angle to the first sheet of light 24 and strikes the surface of the tyre 20 in such a way as to project a second line parallel to the line from the first sheet of light and spaced a distance away from it e.g. between 5 and 50 mm away; preferably between 5 and 20 mm away; most preferably about 10 mm away. Similarly to the situation shown in FIG. 4, some of the light from both sheets of light will strike protruding portions of the tread pattern, while some will strike recessed portions. Projecting two lines of light onto the surface of the tyre 20 allows can give two independent images of the tread pattern. By using suitable pattern-matching techniques on parts of the pattern, the processing unit 12 can detect misalignment of the portable sensor unit 2 relative to the rotational axis of the tyre 20. This can be used either to compensate the data automatically or to issue a warning (or fail to give a confirmation) if a predetermined degree of misalignment is detected, for example by a sound alert emitted through the grille 19 in the sensor unit 2.

Figure 8:
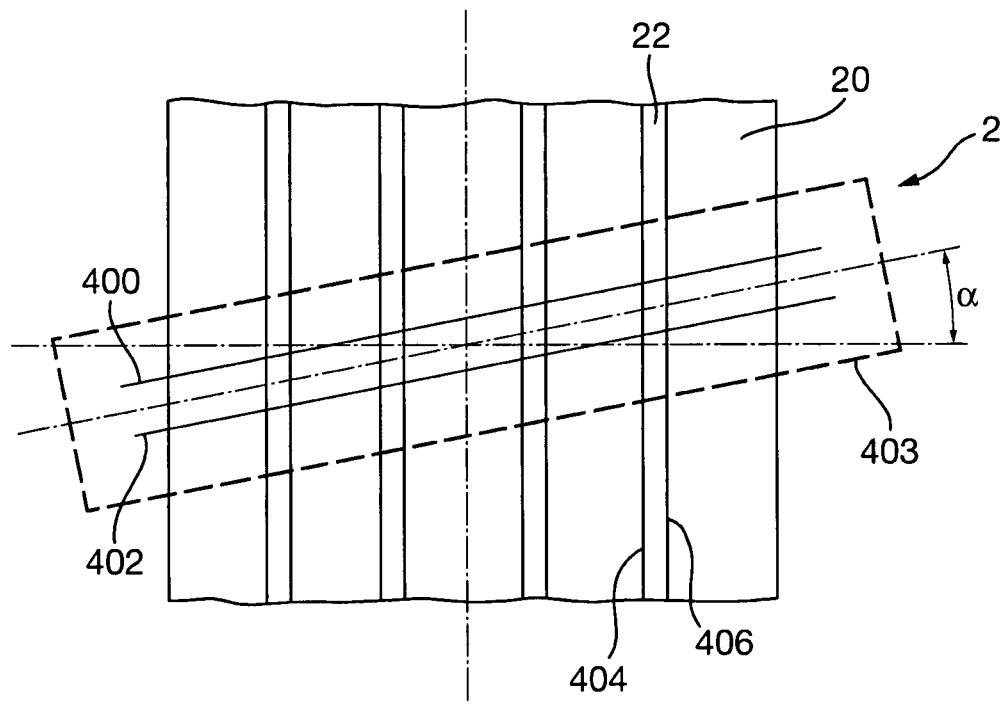
FIG. 8 is a diagrammatic plan view of the surface of a tyre showing two parallel lines of light and construction lines indicating a principle of operation of embodiments of the invention.
Figure 9:
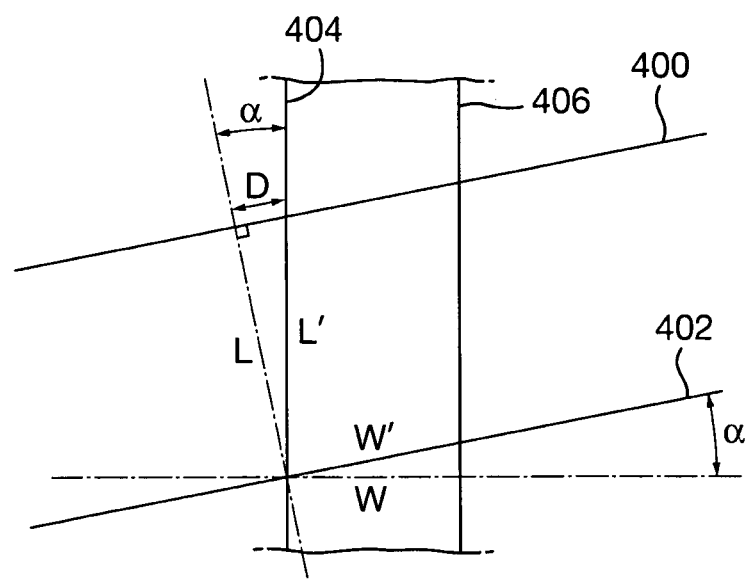
FIG. 9 is a close-up view of the subject of FIG. 8.

FIG. 8 shows a schematic plan view of the surface of the tyre 20. Two parallel lines of light 400, 402 are projected on the tyre surface by two sheets of light 24, 324 (see FIG. 7 for more detail of this step). These cross the tread 22 of the tyre. In particular, they cross first and second straight-line elements 404, 406 of the tread pattern (i.e. continuous indentations or protrusions running around the circumference of the tyre). A heavy dashed line 403 indicates the approximate position of the portable sensor unit 2 in plan view. Alpha represents the angle between the rotational axis of the tyre 20 and the elongate axis of the portable sensor unit 2. Ideally this should be zero for the sensor unit 2 to be correctly aligned with the tyre FIG. 9 shows a close-up of part of FIG. 8, illustrating how the value of alpha can be determined. First, the system must identify straight-line tread features 404, 406 as being such (i.e. as not being zigzagged, wavy or other non-straight features). This can be achieved using a straight sided tread groove or the edge of the tyre tread as it merges into the sidewall. The lateral offset, D, between the intersections of a straight-line feature 404 with the first line of light 400 and with the second line of light 402 can be measured. The known width, L, between the two lines of light 400, 402 can be combined with this offset, D, to determine alpha=$\tan^{-1}(D/L)$.

The data measured by the sensor unit can be used by the processor unit for further analysis such as to confirm compliance with legal requirements or to check for characteristic tread wear patterns which can be helpful in diagnosing other vehicle faults.

It will be appreciated that the embodiment of the invention described above provides a simple device for obtaining an accurate picture of the tread of a tyre whilst still located on a vehicle, which is easy to use simply by rolling it around the tyre while the vehicle is stationary.

Figure 10:
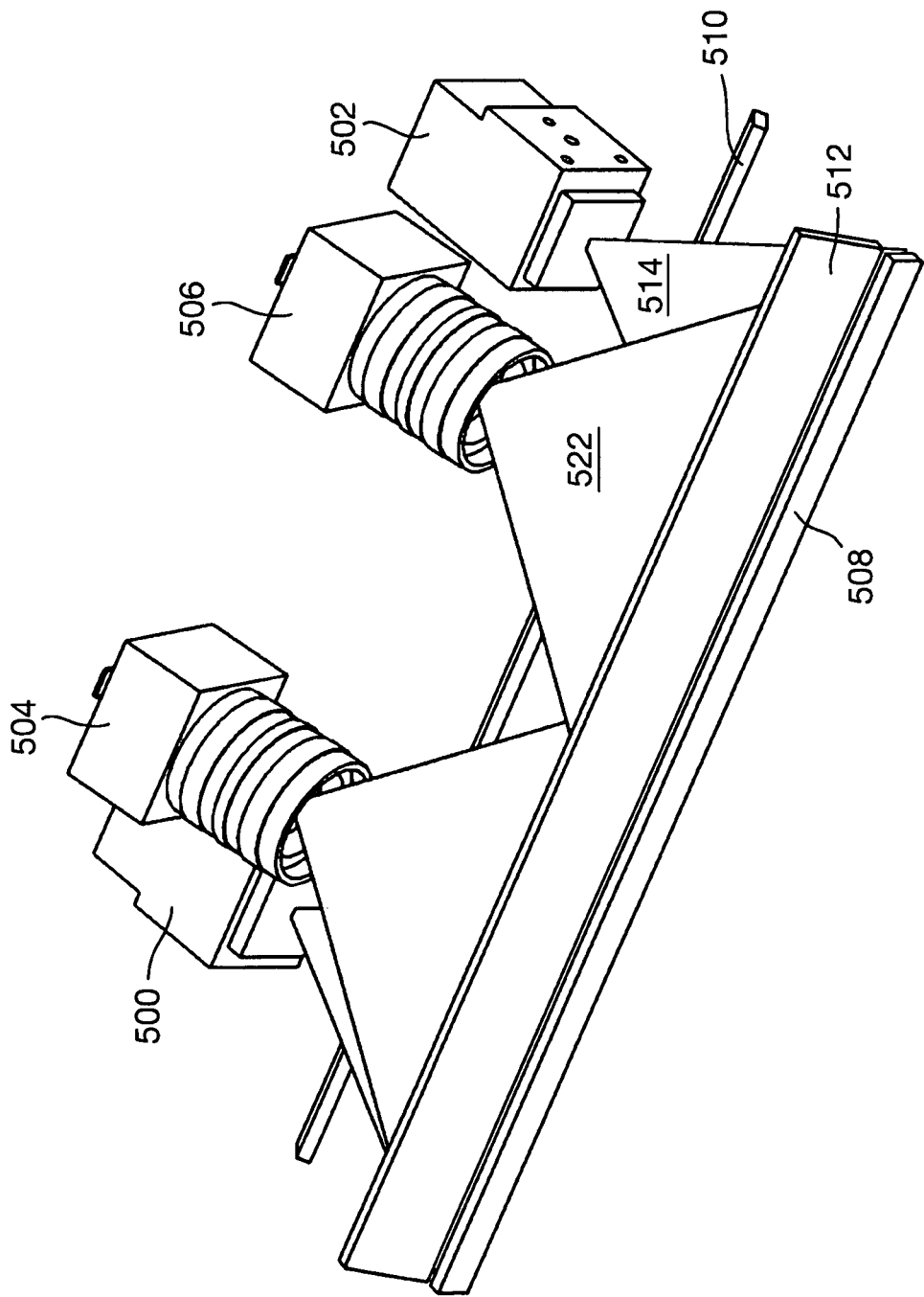
FIG. 10 is a perspective drawing of an internal portion of a portable sensor unit according to a second embodiment.
Figure 11:
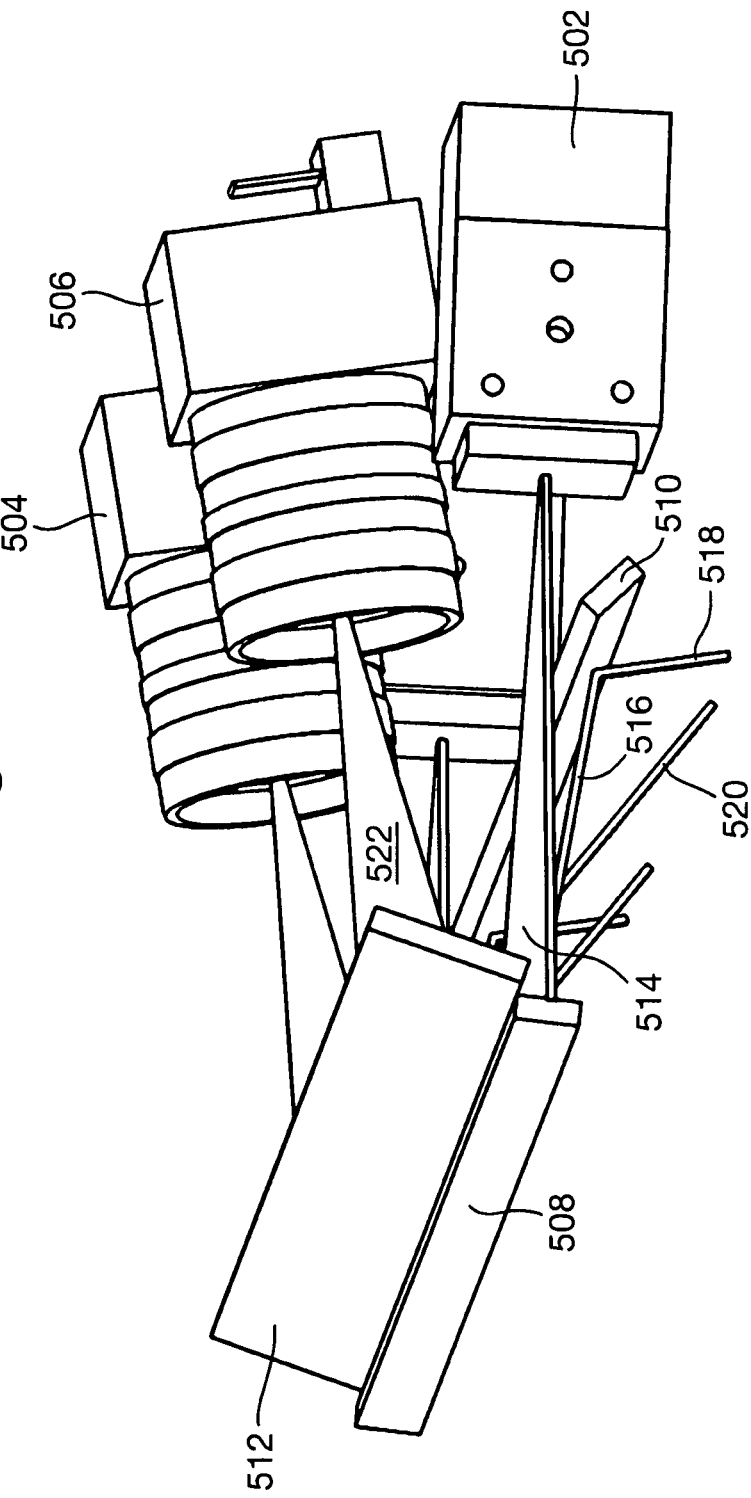
FIG. 11 is a further perspective drawing of an internal portion of the second embodiment.
Figure 12:
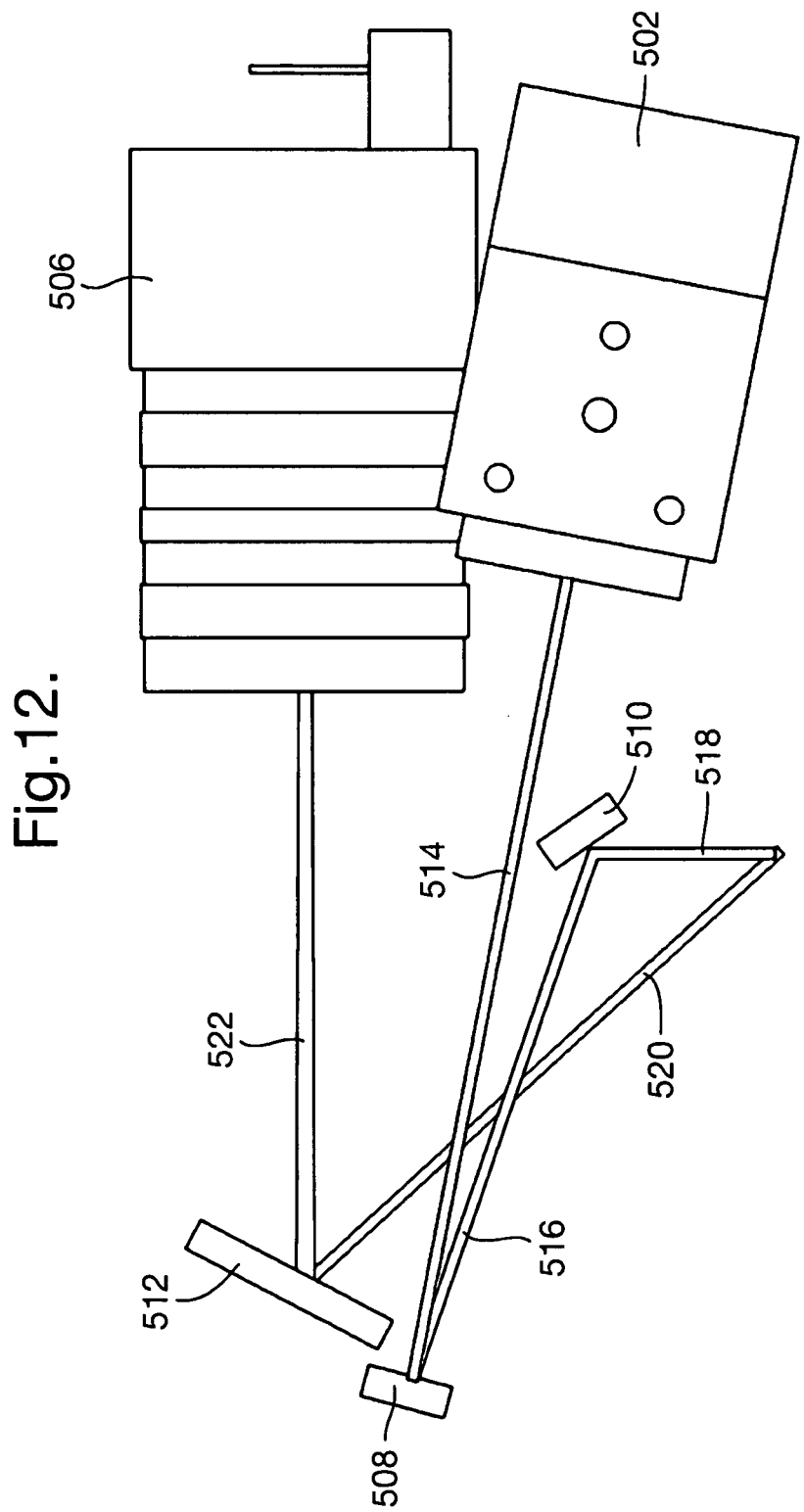
FIG. 12 is a side view of an internal portion of the second embodiment.

FIGS. 10 to 12 show, from different angles, the arrangement of the main optical components of a further embodiment of the invention. In use, a tyre (not shown) would be located at the bottom of the figures, with its upper tread surface facing the apparatus.

These optics may be used in a portable sensor unit similar to that of FIG. 1, or they may be used (in an arrangement inverted from that shown) to inspect a tyre as it drives over the apparatus. The optical components might in that case be located in an inspection pit or in a wheel ramp.

The apparatus comprises a left laser line generator 500 and a right laser line generator 502, alongside a left camera 504 and a right camera 506. The laser line generators are pointed towards respective halves of an elongate, planar mirror 508. A further elongate, planar mirror 510 is arranged to face the first mirror 508, albeit at a different horizontal angle. The two mirrors 508, 510 are preferably the same dimensions as each other. A third elongate, planar mirror 512 is arranged in the field of view of both cameras 504, 506. This mirror may have the same dimensions as the other mirrors 508, 510 but is preferably the same length along its elongate axis, and the same thickness, but about twice as tall, allowing an area of the tyre surface to be imaged which is wider than the elongate pattern of light. In use, a sheet of light 514 travels along a path from the right laser line generator 502 to the first mirror 508. It is reflected by this mirror along a path 516 to the second mirror 510, which in turn directs the light along a path 518 to strike the surface of the tyre approximately perpendicularly. Some of the light is reflected diffusely from the tyre surface along a path 520, inclined at an angle to the perpendicular, towards the third mirror 512. This mirror 512 reflects the light along a path 522 to the right camera 506.

Light from the left laser line generator 500 follows corresponding paths to the tyre surface and from there to the left camera 504 using the same mirrors 508, 510, 512 but principally employing a different (possibly overlapping) part of the mirror surfaces from the right line generator 502 and camera 506.

The processing of the received images and other details of the apparatus are the same as already described with reference to the first embodiment.

Figure 13:
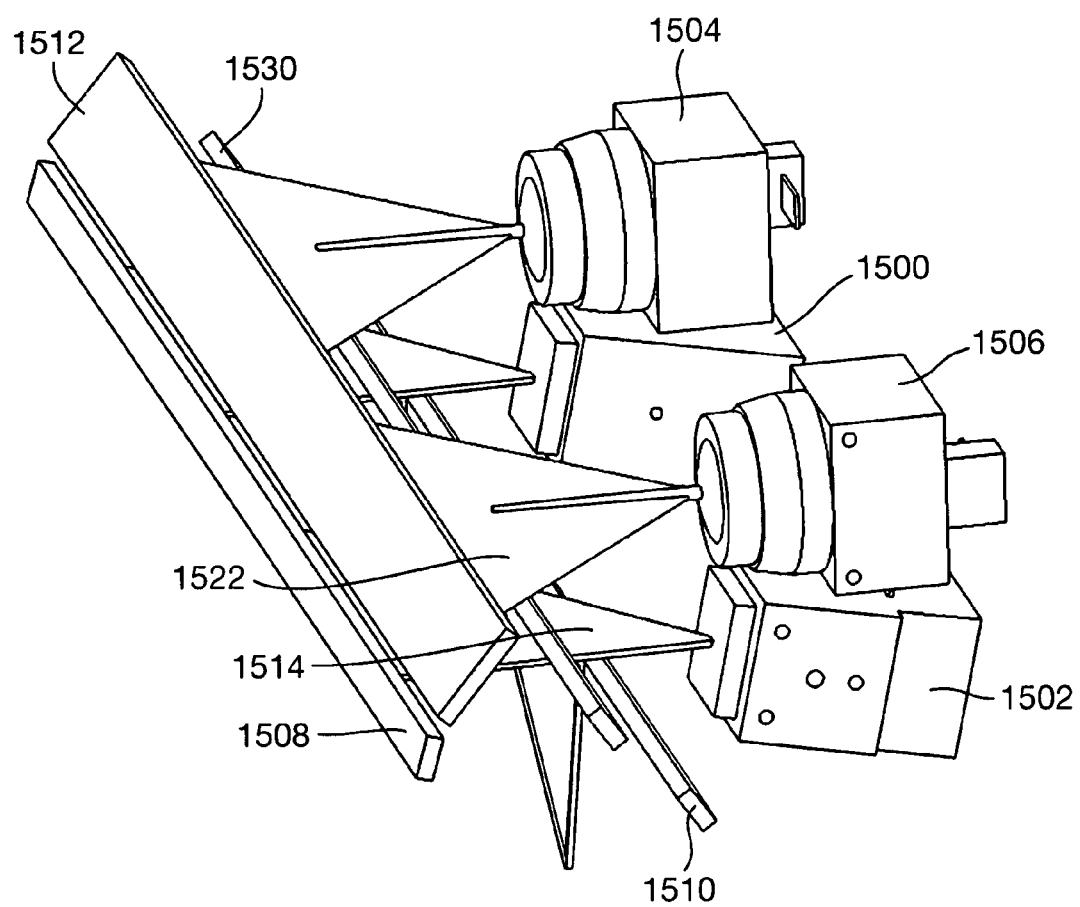
FIG. 13 is a perspective drawing of an internal portion of a portable sensor unit according to a third embodiment.
Figure 14:
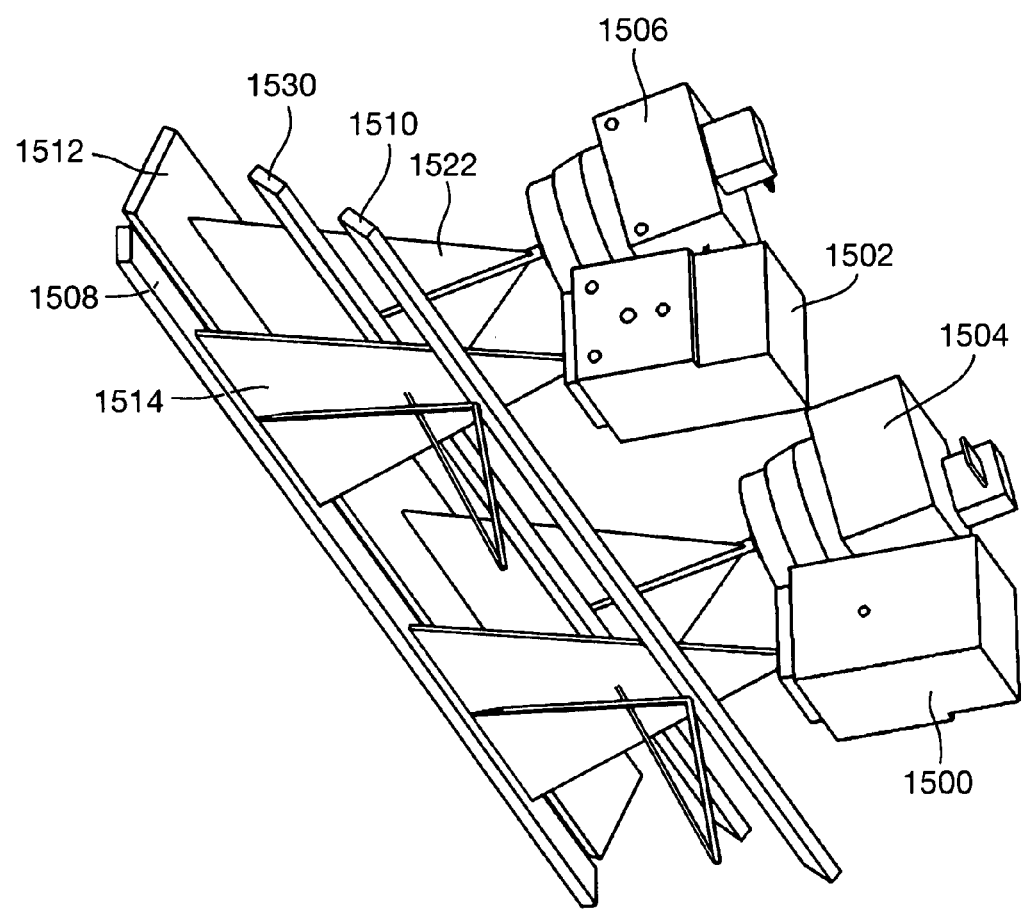
FIG. 14 is a further perspective drawing of an internal portion of the third embodiment.
Figure 15:
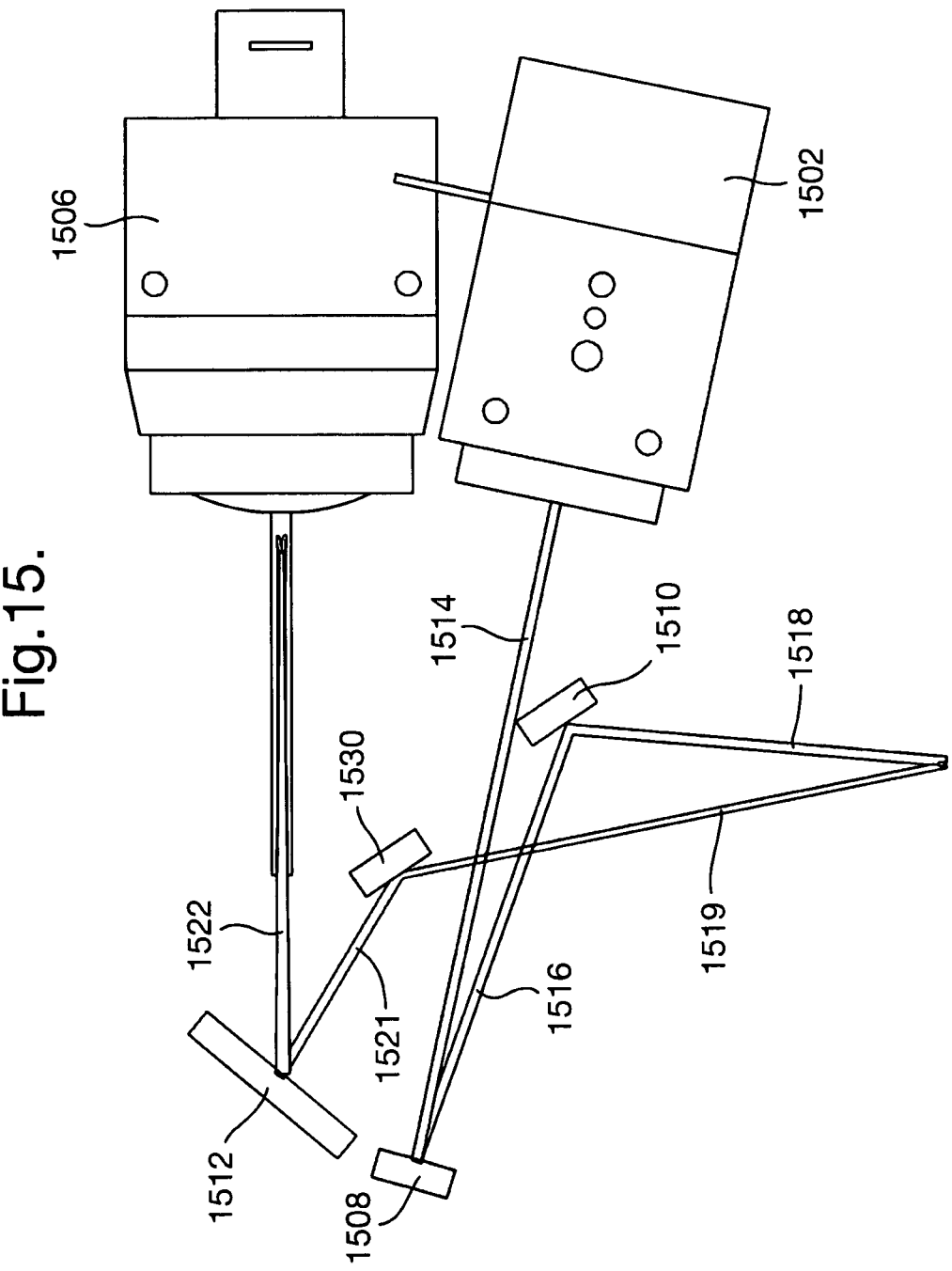
FIG. 15 is a side view of an internal portion of the third embodiment.

FIGS. 13 to 15 show, from different viewpoints, an arrangement of optical components of a third embodiment of the invention, similar to the second embodiment shown in FIGS. 10 to 12 but comprising an additional elongate mirror 1530. Common features from FIGS. 10 to 12 retain the same label with a prefixed numeral 1. This additional mirror 1530 is parallel to the other elongate mirrors 1508, 1510, 1512 and is arranged to reflect light arriving along a path 1519 from the tyre surface on a path 1521 to an elongate mirror 1512, which in turn reflects light along a path 1522 to a right camera 1506. This additional elongate mirror 1530 extends the light path to ensure that there are no blind spots.

Figure 16:
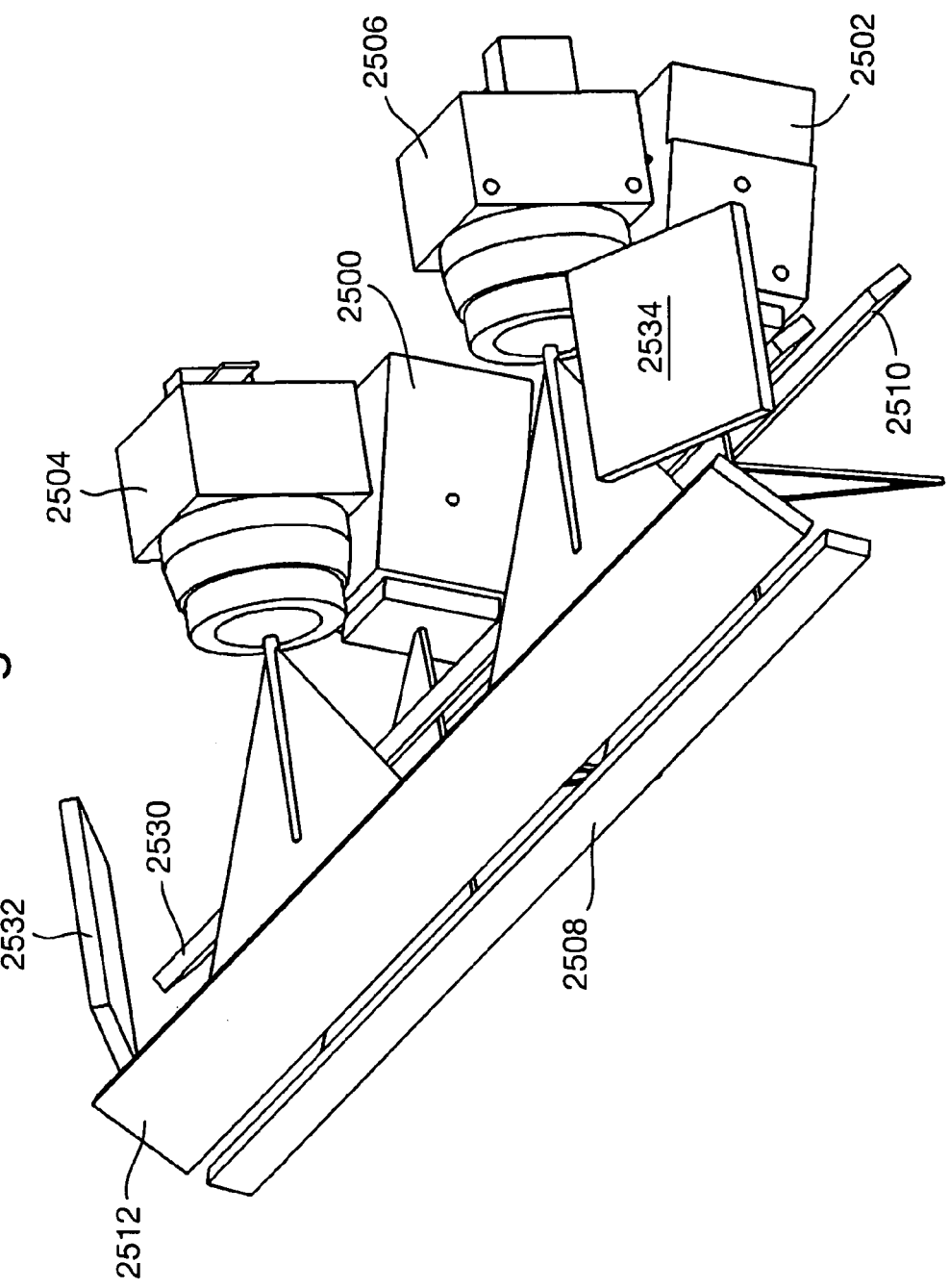
FIG. 16 is a perspective drawing of an internal portion of a portable sensor unit according to a fourth embodiment.
Figure 17:
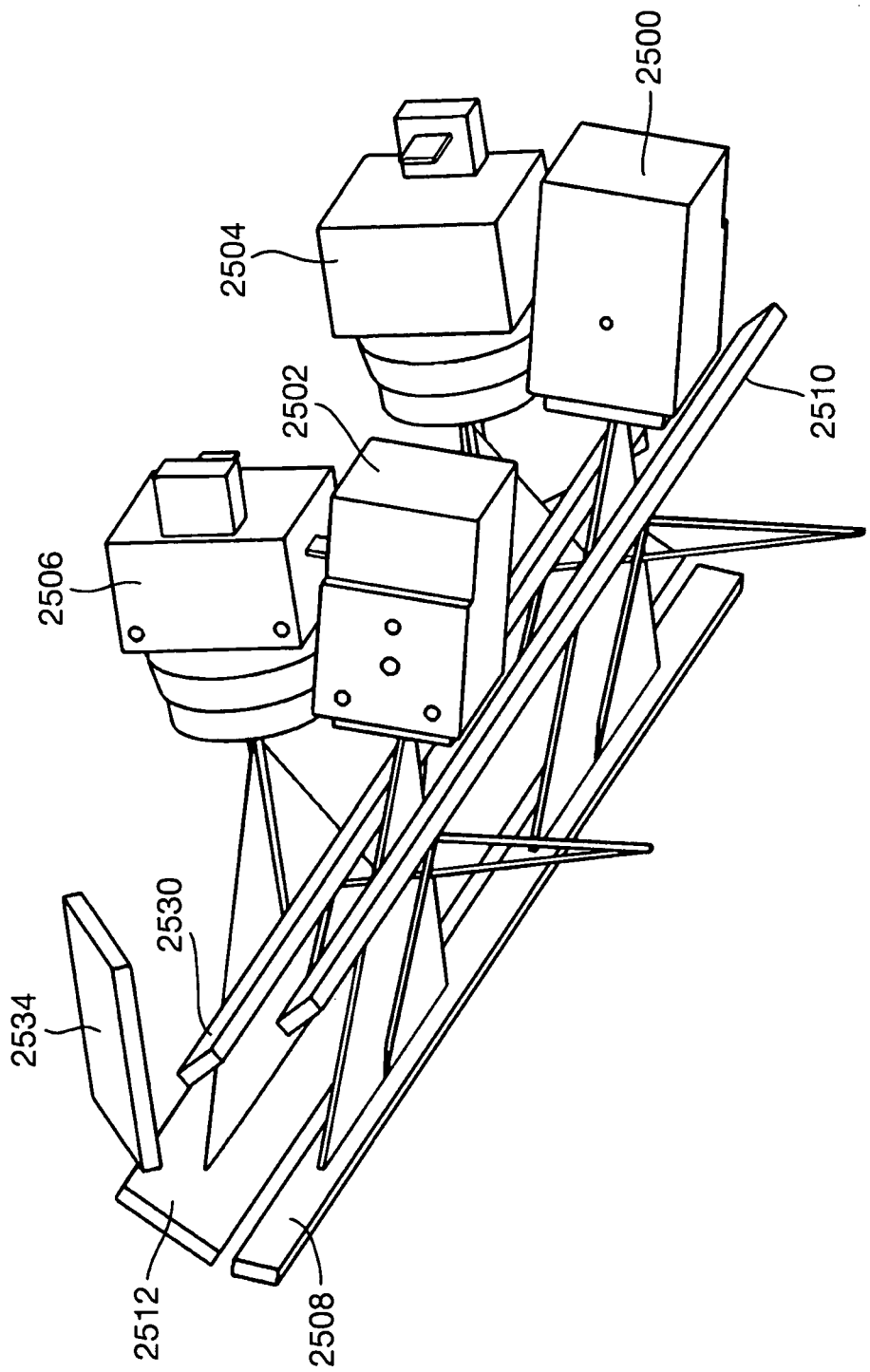
FIG. 17 is a further perspective drawing of an internal portion of the fourth embodiment.
Figure 18:
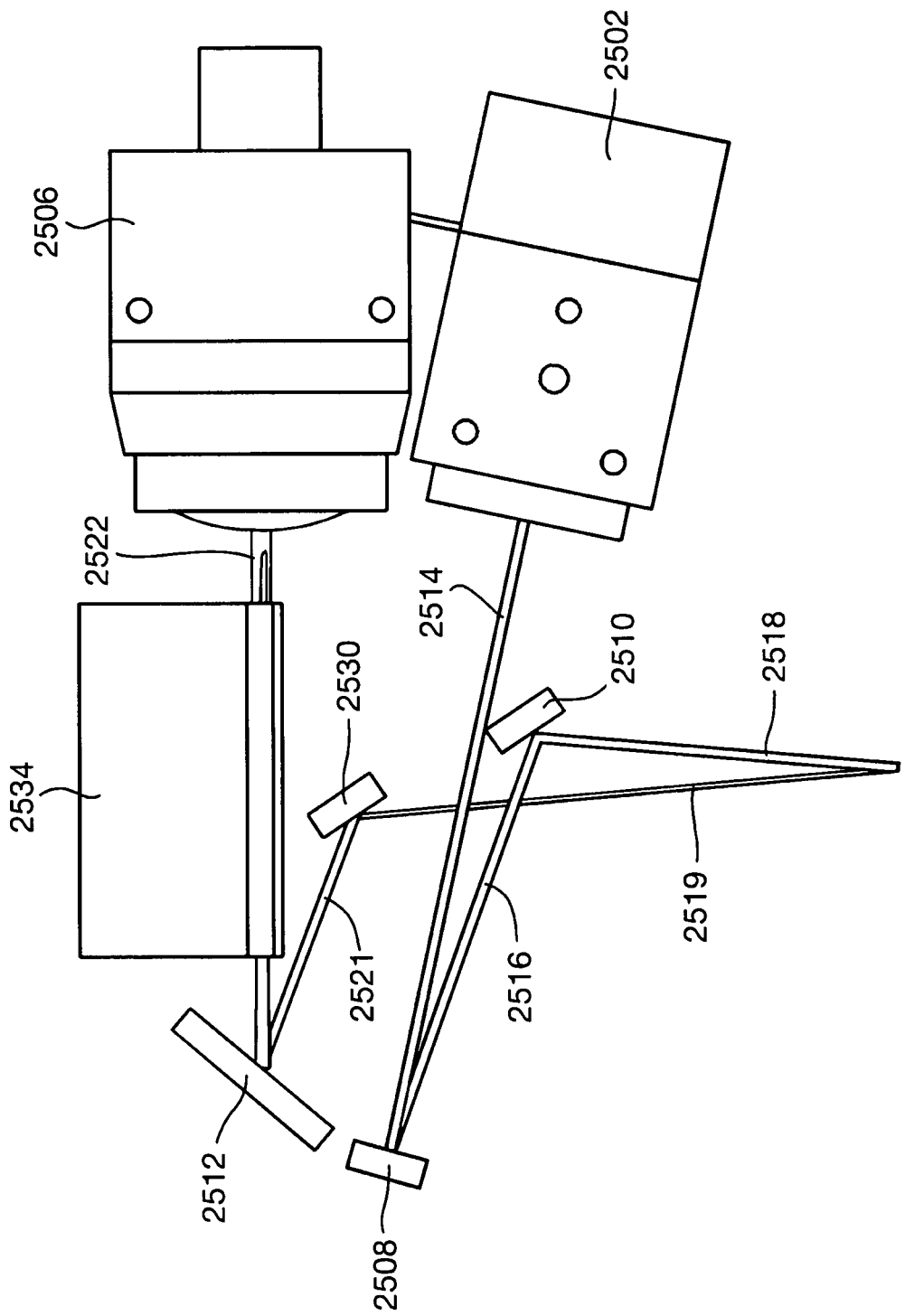
FIG. 18 is a side view of an internal portion of the fourth embodiment.

FIGS. 16 to 18 show, from different viewpoints, an arrangement of optical components of an embodiment of the invention similar to that of FIGS. 13 to 15 but comprising two angled end mirrors 2532, 2534. Common features from FIGS. 13 to 15 retain the same label with a prefixed numeral 2 instead of 1. The apparatus operates in the same manner as before, but a left, angled, end mirror 2532 is located in the field of view of the left camera 2504 and a right, angled, end mirror 2534 is located in the field of view of the right camera 2506. These mirrors are positioned to overhand the edges of the tyre tread, enabling the shoulders and/or sidewalls of the tyre to be imaged. A computer receives the images from the cameras 2504, 2506 and processes the portion of the images corresponding to the shoulders and/or sidewalls appropriately to determine if they are damaged. The end mirrors 2532, 2534 may be arranged to receive light that passes the tyre surface between the elongate mirrors 2508, 2510, 2512, 2530 and reflect this towards the cameras 2504, 2506, or they may be positioned outward of the respective ends of the elongate mirrors 2508, 2510, 2512, 2530. One or both of the angled end mirrors 2532, 2534 may be adjustable in axial position and/or angle, so as to adapt to different width tyres.

Figure 19:
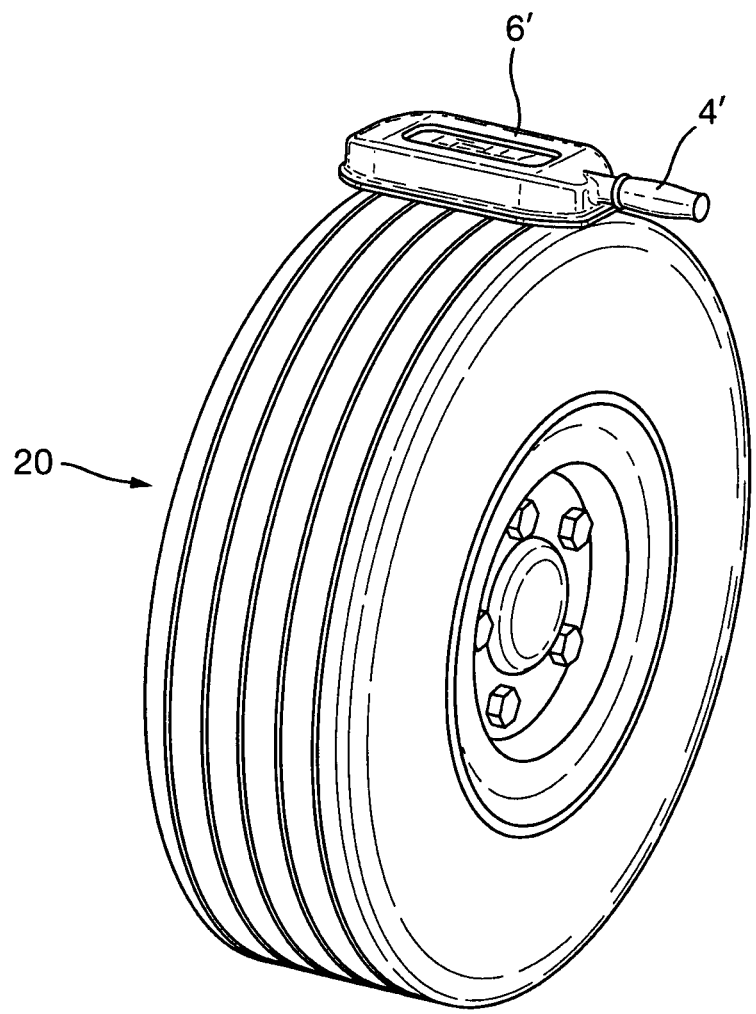
FIG. 19 is a perspective view, similar to FIG. 2, of another hand-held embodiment of the invention.

FIGS. 19 and 20 show respective views of an further embodiment of a hand-held device in accordance with the invention. This is broadly similar to the device described above with reference to FIGS. 1 and 2, It thus comprises a handle 4' connected to an outer housing 6'. Inside it has an elongate roller 50 for allowing the device to roll smoothly around the surface of the tyre 20. It has a separate encoder wheel 52 to permit measurement of the distance it moves around the tyre. A transparent window 54 is provided to protect the optical components (not visible in FIG. 20) behind it. This device incorporates an on-board microprocessor and memory (not shown) which operates the device and allows it to scan, record and possibly analyse tyre tread patterns. Results or data can be transmitted wirelessly to a suitable computing device such as a PDA, smartphone, PC or the like.

The invention claimed is:

1. An apparatus for measuring the tread of a tire on a vehicle comprising:
    a light-emitting arrangement arranged in use to generate an elongate pattern of light;
    a first reflecting arrangement arranged to reflect light from the light-emitting arrangement onto the rolling surface of the tire;
    an imaging arrangement arranged to image a region of the rolling surface of the tire; and
    a second reflecting arrangement arranged to reflect light from the rolling surface of the tire towards the imaging arrangement;
    wherein the apparatus comprises a processor which generates data corresponding to a tread pattern of the tire; and
    wherein at least one of the following arrangements are provided:
    said first reflecting arrangement comprises two or more mirrors arranged to cooperate to reflect light from the light-emitting arrangement onto the rolling surface of the tire;
    said second reflecting arrangement comprises two or more mirrors arranged to cooperate to reflect light from the rolling surface of the tire towards the imaging arrangement; and
    said first reflecting arrangement comprises two or more mirrors arranged to cooperate to reflect light from the light-emitting arrangement onto the rolling surface of the tire and said second reflecting arrangement comprises two or more mirrors arranged to cooperate to reflect light from the rolling surface of the tire towards the imaging arrangement.

2. An apparatus as claimed in claim 1 which is a portable sensor unit and which is suitable for determining tread depth of a tire mounted on a wheel installed on the axle of a vehicle.

3. An apparatus as claimed in claim 2, wherein the imaging arrangement and at least one of said reflecting arrangements are arranged such that, when the unit is in use, they are situated between the two planes containing the respective sidewalls of the tire.

4. An apparatus as claimed in claim 1, wherein said processor is further configured to generate data corresponding to tread depth for the tire mounted on a wheel installed on the axle of a vehicle when said vehicle is driven onto or over said apparatus.

5. An apparatus as claimed in claim 4 comprising a ramp for lifting a wheel of the vehicle.

6. An apparatus as claimed in claim 4 wherein said first reflecting arrangement is arranged to reflect light upwards towards the surface of the tire.

7. An apparatus as claimed in claim 4 wherein said first reflecting arrangement is arranged to reflect said light towards the surface of the tire at an angle of less than 45 degrees to the vertical.

8. A method as claimed in claim 4 wherein said first reflecting arrangement is arranged to reflect said pattern of light so that the light strikes the tire surface at an angle of less than 45 degrees to the normal.

9. A method as claimed in claim 4 wherein the first and second reflecting arrangements are arranged such that the angle at which light reaches the imaging arrangement differs from the angle at which said pattern of light from the light-emitting arrangement reaches the tire surface.

10. An apparatus as claimed in claim 1 comprising one or more rollers arranged to engage the vehicle tire.

11. An apparatus as claimed in claim 1 comprising a window arranged such that light passes through the window when travelling to the tire surface and when travelling from the pattern on the tire towards the imaging arrangement.

12. An apparatus as claimed in claim 1 comprising a laser arranged to project an elongate pattern of light onto the tire surface.

13. An apparatus as claimed in claim 1 wherein said mirrors are at least 90% of the length of the elongate pattern of light.

14. An apparatus as claimed in claim 1 comprising first and second imaging arrangements arranged in use to image respective first and second regions of the rolling surface of the tire, the first region extending further towards the inner sidewall of the tire than does the second region.

15. An apparatus as claimed in claim 14 wherein the first reflecting arrangement comprises a reflecting surface substantially centered within the field of view of the first imaging arrangement in a direction parallel to the wheel axis.

16. An apparatus as claimed in claim 15 wherein a plurality of said reflecting surfaces are provided by a single faceted reflector.

17. An apparatus as claimed in claim 14 wherein the second reflecting arrangement comprises a second reflecting surface located to one side of the field of view of the first imaging arrangement in a direction parallel to the wheel axis.

18. An apparatus as claimed in claim 17 comprising a further reflecting surface located symmetrically to the second reflecting surface about a central axis in the field view perpendicular to the wheel axis, and arranged to reflect light received indirectly from the surface of the tire directly to the first imaging arrangement.

19. An apparatus as claimed in claim 1 comprising a further imaging arrangement arranged to image one or both of the shoulders or sidewalls of the tire.

20. An apparatus as claimed in claim 19 comprising a light-guiding arrangement arranged to direct light from one or both of the shoulders or sidewalls of the tire towards said further imaging arrangement.

21. A method of measuring the tread of a tire on a vehicle comprising:
    generating an elongate pattern of light from a light-emitting arrangement;
    using a first reflecting arrangement to reflect light from the light-emitting arrangement onto the rolling surface of the tire;
    using a first reflecting arrangement to reflect light from the rolling surface of the tire towards imaging arrangement; and
    imaging a region of the rolling surface of the tire;
    generating, in a processor, data corresponding to a tread pattern of the tire;
    wherein at least one of the following arrangements are provided:
    said first reflecting arrangement comprises two or more mirrors arranged to cooperate to reflect light from the light-emitting arrangement onto the rolling surface of the tire;
    said second reflecting arrangement comprises two or more mirrors arranged to cooperate to reflect light from the rolling surface of the tire towards the imaging arrangement; and
    said first reflecting arrangement comprises two or more mirrors arranged to cooperate to reflect light from the light-emitting arrangement onto the rolling surface of the tire and said second reflecting arrangement comprises two or more mirrors arranged to cooperate to reflect light from the rolling surface of the tire towards the imaging arrangement.

22. A method as claimed in claim 21 comprising imaging said region of the rolling surface of the tire whilst the tire is located above an apparatus adapted to carry out said generating, reflecting and imaging steps.

23. A method as claimed in claim 22 comprising reflecting light upwards towards the surface of the tire.

24. A method as claimed in claim 22 comprising reflecting light towards the surface of the tire at an angle of less than 45 degrees to the vertical.

25. A method as claimed in claim 22 comprising reflecting light so as to strike the tire surface at an angle of less than 45 degrees to the normal.

26. A method as claimed in claim 22 wherein the angles at which light forming the pattern on the tire surface reaches the imaging arrangement differ from the angle or angles at which light from the light-emitting arrangement reaches the tire surface.

27. A method as claimed in claim 22 comprising reflecting light from the light-emitting arrangement simultaneously onto the rolling surfaces of a plurality of tires.

28. A method as claimed in claim 21 further comprising the step of using said measurement of tire tread automatically to diagnose tire, vehicle or driver faults or to predict a remaining service life of the tire.

\* \* \* \* \*

UNITED STATES PATENT AND TRADEMARK OFFICE
CERTIFICATE OF CORRECTION

| | |
|---|---|
| PATENT NO. | : 8,625,105 B2 |
| APPLICATION NO. | : 13/254319 |
| DATED | : January 7, 2014 |
| INVENTOR(S) | : Andrew Pryce et al. |

It is certified that error appears in the above-identified patent and that said Letters Patent is hereby corrected as shown below:

In the claims

At claim 21, column 20, line 8, delete "first" before the word "reflecting" and insert --second--.

Signed and Sealed this
Twenty-fourth Day of November, 2015

Michelle K. Lee
*Director of the United States Patent and Trademark Office*